United States Patent [19]

Leenstra, Sr. et al.

[11] Patent Number: 5,555,409

[45] Date of Patent: Sep. 10, 1996

[54] DATA MANAGEMENT SYSTEMS AND METHODS INCLUDING CREATION OF COMPOSITE VIEWS OF DATA

[75] Inventors: Richard B. Leenstra, Sr., Bremerton; Edwin H. Wurden, Poulsbo; Lance N. Otis, Silverdale; Frederick L. Wurden, Port Orchard, all of Wash.

[73] Assignee: Applied Technical Sysytem, Inc., Port Orchard, Wash.

[21] Appl. No.: 226,071

[22] Filed: Apr. 11, 1994

Related U.S. Application Data

[63] Continuation-in-part of Ser. No. 621,834, Dec. 4, 1990, Pat. No. 5,303,367.

[51] Int. Cl.$^6$ .................................................. G06F 15/40
[52] U.S. Cl. ........................... 395/600; 364/DIG. 1; 364/222.81; 364/282.1; 364/283.1; 364/283.2
[58] Field of Search ..................... 395/600, 149, 395/160, 700

[56] References Cited

U.S. PATENT DOCUMENTS 5,303,367  4/1994  Leenstra, Sr. et al. ................. 395/600
5,454,101  9/1995  Mackay et al. ......................... 395/600

OTHER PUBLICATIONS

European Patent Application, Publication No. 0270360, Jun. 8, 1988, Tektronix, Inc.

PCT International Application, International Publication No. WO89/09972, Oct. 19, 1989, Digital Equipment Corporation.

Tremblay, Jean–Paul et al., "An Introduction to Data Structures with Applications," 2nd Ed., McGraw–Hill, Inc., 1984, pp. 811–825.

*Primary Examiner*—Paul V. Kulik
*Attorney, Agent, or Firm*—Hughes, Multer & Schacht

[57] ABSTRACT

Computer-based systems and methods for managing data. These systems and methods take advantage of a unique model which: increases speed and flexibility; eliminates the need for a complex data manipulation language, data or application dependent software, and separate structuring tools such as pointers, lists, and indexes; and automatically creates among the data relationships which may or may not have been apparent to a user or the designer. Salient, unique features of the systems and methods are their capabilities for: efficiently creating a composite view of the data; importing data from and exporting data to external databases; and otherwise providing significant and advantageous, additional control over the creation, maintenance, and display of the data making up a database constructed in according with the principles described in parent application Ser. No. 07/621,834 filed 4 Dec. 1990.

30 Claims, 19 Drawing Sheets

NOTE: DELIMITER CAN BE ANY BINARY NUMBER USUALLY THE BINARY REPRESENTATION OF, SYMBOL SUCH AS "/" OR "*"

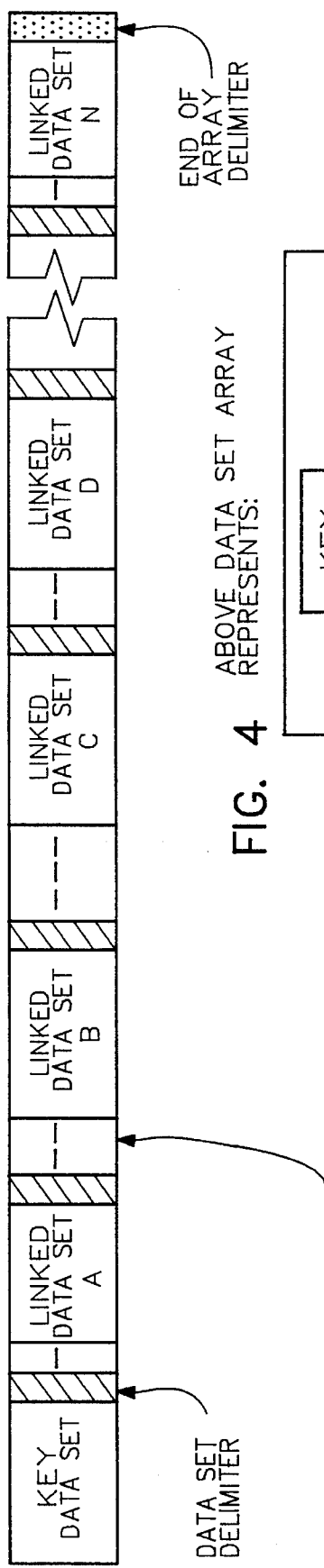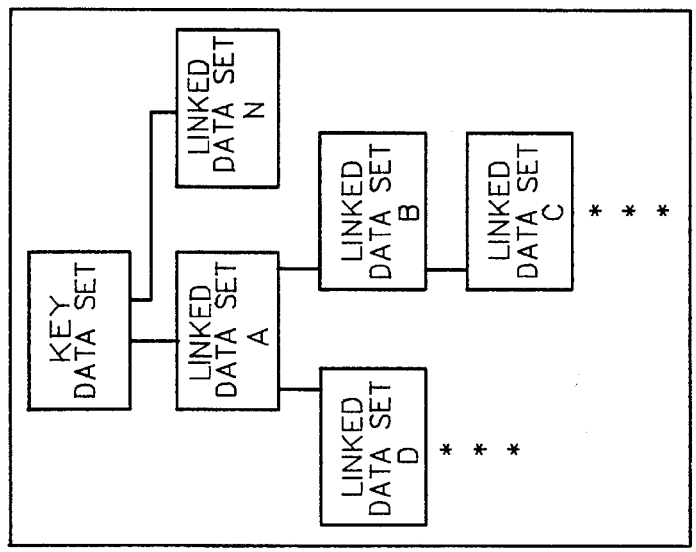
FIG. 3 DATA SET ARRAY STRUCTURE
FIG. 4 ABOVE DATA SET ARRAY REPRESENTS:
INDENTURE HIERARCHY INDICATOR
1. HIERARCHY INDICATOR CAN CONSIST OF ONE OR MORE INDICATORS SIGNIFYING HIERARCHY LEVEL;
2. CAN ALSO SERVE AS A START OF DATA SET DELIMITER;
3. VALUE OF DELIMITER/MARKER CAN BE USED TO SIGNIFY HIERARCHY DIRECTION AS WELL AS LEVEL EG: − FOR DOWN LEVEL, + FOR UP LEVEL

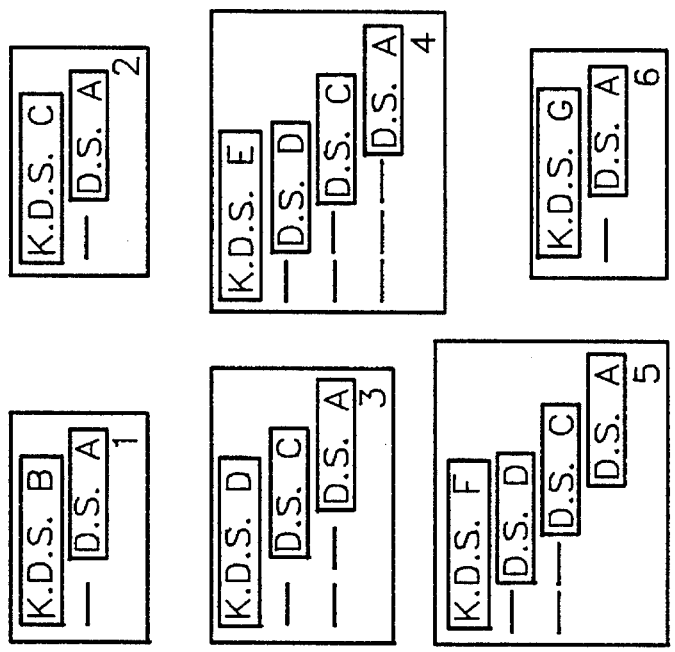
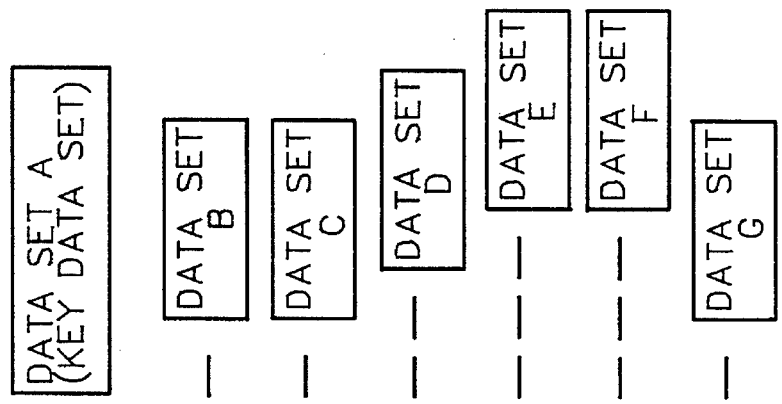
FIG. 5

FIG. 6

DATA CONTROL MODULE

| DATA TYPE | DESCRIPTION | KEY DATA TYPE | LINKING LIMITATIONS | | INVERT LINK | GLOBAL LINK |
|---|---|---|---|---|---|---|
| | | | LINKS TO DATA SET | WITHIN KEY DATA ARRAY | | |
| COST | UNIT PRICE OF PART | N | MFR-PN | MFR | N | N |
| LOCATION | LOCATION | Y | NSN | NSN | N | Y |
| MFR | MANUFACTURER | Y | SUP-PN | MFR | N | N |
| MFR-PN | MANUFACTURER'S PART NUMBER | Y | MFR | MFR | Y | N |
| NSN | NATIONAL STOCK NUMBER | Y | SUP | SUP | Y | N |
| PHONE | TELEPHONE NUMBER | Y | LOCATION | LOCATION | Y | N |
| | | | MFR-PN | MFR-PN | Y | N |
| | | | PHONE | PHONE | Y | N |
| | | | MFR | MFR | Y | N |
| SUP | SUPPLIER | Y | MFR-PN | MFR | Y | N |
| | | | MFR | MFR | Y | N |
| | | | SUP | SUP | Y | N |
| | | | LOCATION | LOCATION | Y | N |
| | | | MFR-PN | MFR | Y | N |
| | | | PHONE | PHONE | Y | N |
| SUP-PN | SUPPLIER'S PART NUMBER | Y | SUP | MFR | Y | N |

NOTE: SELECTED DATA SET (Y) FROM THE KEY DATA SET (X) ARRAY COULD BE THE KEY DATA SET (X) ITSELF, IN THE GENERAL CASE

DATA MANAGEMENT SYSTEMS AND METHODS INCLUDING CREATION OF COMPOSITE VIEWS OF DATA

RELATION TO PENDING APPLICATION

This application is a continuation-in-part of application Ser. No. 07/621,834 filed 4 Dec. 1990, now U.S. Pat. No. 5,303,367.

TECHNICAL FIELD OF THE INVENTION

The present invention relates to novel, improved methods and systems for structuring, storing, accessing, modifying, and processing data.

For the sake of clarity and brevity, the principles of the present invention will be developed primarily with reference to computer driven applications of the invention. It is to be understood, however, that this is not intended to limit the scope of the invention as defined in the appended claims.

BACKGROUND OF THE INVENTION

The parent application discloses certain new and novel data management technology which makes use of a database model termed the Contiguous Connection Model (CCM).

The CCM eliminates the need for data-dependent programming because data definitions, data values, and data relationships are directly incorporated into a single generic database structure. The result is a self-describing database that is absolutely independent of the type of data being handled and therefore requires no application specific or data dependent software to define, maintain, or display data relationships for a given enterprise. Systems employing the CCM system also automatically create and display complete and correct connections among all input data. These connections go beyond user-defined data relationships in that connections are automatically established between real but seemingly unrelated data relationships that would otherwise be invisible to the user.

Thus, the previously disclosed invention makes it possible to index large sets of user-defined data via a unique data-independent input, indenturing, inversion, and automatic connection process. Further, this requires only two essential data structures, a Data Set (consisting of two generic data elements, data type and data value) and a Data Set Array (consisting of a Key Data Set and related data sets). Together these structures provide the capability to manage virtually unlimited numbers of data types and data relationships.

System and process features that distinguish CCM database management systems and methods from those heretofore used and proposed include:

Generic Data Structures Consisting of a Generic Data Type and Data Value and a Generic Data Set Array Indentured Data Set Relationships Inversion of Data Set Relationships Within an Array Dynamic Reorganization of Data Sets Data Control Module

GENERIC DATA STRUCTURE

The CCM is unique in that it replaces data fields and separate field name files with one basic unit called a Data Set which consists of two integral (inseparable), generic, variable length, data elements --Data Type and Data Value--. Together, these define the specific data type and provide a specific data value. The Data Set performs functions beyond that of conventional fields, however, in that it provides functionality similar to conventional records. Data Sets are mapped into linear address space in memory and to formatted physical subdivisions of real recording media in terms of this basic unit. The generic nature of the Data Set frees CCM from the restrictive, rigidly defined "data elements", "fields", and "records" of conventional DBMS methodologies. The user is able to introduce new types of data into the system as the need arises without having to reprogram database definitions, report generators, or screen displays.

The Data Set Array replaces the records and record indexes of conventional databases. The Data Set Array consists of an integral (not external) indexing key, called a Key Data Set, followed sequentially by indentured Data Sets which consist of all related descendent Data Sets in the hierarchy (called Linked Data Sets). These Linked Data Sets are input and maintained in correct hierarchical-sequential order relative to the Key Data Set at all times and thereby act as a source of related descendent Data Set information.

INDENTURED DATA SET RELATIONSHIPS

Today, all computer manipulated, standard databases structure relations between records; and relations between fields within records are established separately by pointers, separate lists, or separate indexes. Systems and methods employing the CCM depart substantially from this way of relating data. In CCM utilizing systems and methods, relationships are directly defined between Data Sets within a Data Set Array, not between conventional records.

This has the advantage that no record construct for data relationships is required. Instead, all complex networks of related Data Sets are decomposed into a multiplicity of hierarchical relationship trees, each with a single Key Data Set. In turn, each of these hierarchies is embodied in a Data Set Array consisting of a single Key Data Set used to access the database and hold the "top" or "root" position in the hierarchy of the array and any number of subordinate, Linked Data Sets making up a hierarchy. All Linked Data Sets describe the Key Data Set in a given array.

Linked Data Sets in the resulting Data Set Array are indentured to the Key Data Set, without duplication, in true hierarchical order by physically and logically ordering the Linked Data Sets within an Array using indenture hierarchy designators at the start of each Linked Data Set. Therefore, no additional data elements, indexes, or pointers are required in CCM-based systems and methods to allow for an endless set of source data relationships via indenture. This provides complete flexibility in defining discrete data relationships regardless of the application.

Whenever a Data Set is linked to another Data Set within a Data Set Array, CCM inverts the input relationship, creating a new (or updated) Data Set Array with the input Linked Data Set as the Key Data Set and all direct predecessors (parent, grandparent, etc.) in the original Data Set Array linked to the input Data Set in inverted order. This process of inverting the input relationship hierarchy, called Inversion, automatically generates or updates an existing Data Set Array for each input Data Set. Thus Inversion integrates under a common Key Data Set all Data Sets from all Arrays that contain the common Linked Data Set. In other words, every unique Linked Data Set will exist as a Key Data Set in a Data Set Array. This enables access via any Data Set to all explicit relationships in the database directly and without derivation of the relationships. Therefore, through Inversion, the Data Set Array replaces the separate indexes needed by prior art database management systems and methods.

Inverted Data Set Arrays have the same organization as Data Set Arrays. They consist of a Key Data Set and Linked Data Sets. Linked Data Sets consist of all directly related precedent Data Sets in the original Key Data Set hierarchy. These linked Data Sets are maintained in inverted hierarchical sorted order relative to the Key Data Set at all times and thereby act as a source of information for locating related precedent Data Sets.

Inversion automatically creates contiguous connections among all Data Set Arrays having a common Data Set link. This provides a very fast, direct access to every Data Set. Within a given array, there is a direct, physical link between Data Sets; and these relationships are immediately displayed when the array is accessed by its Key Data Set. Each of these Linked Data Sets in turn provides a contiguous connection to another Array where the Linked Data Set is the key Data Set. This allows the user to traverse these contiguous connections, thereby moving from one array to another having a common Data Set connection. These connections are complete; they are correct; and they are created automatically regardless of the type or nature of input data.

The Inversion process creates a duplicate set of inverse data relationships for every user input relationship. This provides for a self-healing database capability since the computer can be programmed using only commonly available techniques to compare a Data Set Array's Linked Data Set hierarchies and automatically detect and correct an imbalance between the relationships in the arrays and the inverted arrays which could arise from those power failures and other disturbances that can affect the integrity of any computer manipulated database.

DYNAMIC REORGANIZATION OF DATA SETS

The CCM maintains the Data Set Array file in logical sequence by Key Data Set in either a hashed key or an alphanumeric sequence. Within each Data Set Array, CCM physically maintains the Linked Data Sets in hierarchical alphanumeric sequence. This rearrangement is accomplished dynamically at each user input.

Because all data relationships are physically established and ordered within a Data Set Array through the input/inversion end reordering processes, all data and all data relationships are instantaneously displayed; i.e., relationships do not have to be derived. Moreover, since the Data Set Arrays all exist in a single file and are always in logical order, efficient search routines such as a hashed key or a binary search can provide a nearly instantaneous location of any Data Set Array regardless of database size.

DATA CONTROL MODULE (DCM)

The CCM DCM allows the user to: impose constraints on data inputs and relationships, define Data Type restrictions, specify which Data Types will be subject to automatic Inversion and Global Linking (relationships maintained from one Data Set Array to another in the manner described in the '834 application, now U.S. Pat. No. 5,303,367), and provide security to restrict database access and file maintenance capability by Data Type. The DCM is not required for application of the CCM. However, it provides tools to limit a specific database application to a user-specified subset of all possible data types and relationships; i.e., it defines the grammar and semantics of the data domain being modeled.

Database management systems and methods of the character disclosed in the '834 application, now U.S. Pat. No. 5,303,367, are superior to those utilizing conventional DBMS methodologies in terms of flexibility, speed, and the automatic creation and display of implicit, as well as explicit, connections among user input data.

The use of generic data elements and a generic data structure eliminates the need for multiple record structures and multiple database indices. The index, the file, and the database are one and the same.

Because of its underlying design: the database can be directly accessed by any and all input data; new data types and relationships can be added at any time without change to the underlying database structure; and complex data relationships are instantly available to the user.

The system automatically creates complete and correct data connections, including connections that would not otherwise be apparent to system designers and users.

The single consolidated Data Set Array file provides for automatic reorganization of all data and data relationships during input, allowing nearly instantaneous data retrieval.

Complex data manipulation languages are not required since all Data Sets and their relationships exist and are available in the database and do not need to be generated by a data manipulation language.

Also, it is by no means necessary that a computer driven system be employed to implement the CCM system disclosed in the parent application. This is significant because there are applications in which, because of cost and/or other considerations, the use of a computer for these purposes is contraindicated.

SUMMARY OF THE INVENTION

Data management systems and methods of the character disclosed in the parent application but with a number of new, novel, and significant features have since been invented and are disclosed herein.

These significant new features include:

Connection Views by Query (CVQ)

External Database Bond (EDB)

Role Exchange

Custom Methods by Type

Array Hierarchy Restraints

Composite views of database data are commonly created by a mechanism called database queries.

As discussed above, the parent application discloses a technique termed Automatic Projection Connection for creating a composite view of CCM data. Disclosed herein is another technique for efficiently creating composite views of the CCM data which is termed Connection View by Query. CVQ finds all direct and indirect relationships, if any, between two or more Data Types, Data Set Values or Data Sets, as defined by the user's query selection criteria.

The External Database Bond provides the ability to import data into the CCM database from an existing external relational database and to export data from CCM to external relational databases. EDB provides an interface to existing, external, relational databases and provides a means for use of Standard Query Language (SQL) tools for communication with such databases. Thus, costly, existing relational databases can be accessed without the need for replacement.

Role Exchange, Custom Methods by Type, and Array Hierarchial Restraints make it possible to provide significant and advantageous, additional control over the creation, maintenance, and display of the data making up a database constructed in accord with the principles disclosed in the '834 application. Representative specific advantages provided by these novel features include the ability to easily relate the Key Data Set of a particular Data Set Array to another, completely different Data Set Array; predictable screen placement of data; faster input of data; the ability to display pictures, graphic summaries, and other data not stored in the CCM; increased control over the integrity of the database; and the elimination of performance bottlenecks.

The important objects, features, and advantages of the invention will be apparent to the reader from the foregoing and the appended claims and as the ensuing detailed description and discussion proceeds in conjunction with the accompanying drawings.

BRIEF DESCRIPTION OF THE DRAWINGS

In the drawings:

FIG. 3 is a diagram depicting the structure of a Data Set Array showing the indentured relation of N Linked Data Sets in the array to the Key Data Set of the array;

FIG. 4 is a hierarchial tree graph of the Data Set Array depicted in FIG. 3;

FIG. 5 is a pictorial representation of a Data Set Array and Inverted Data Set Arrays created therefrom by Inversion in systems and methods employing the principles of the present invention;

FIG. 6 is a diagram containing a representative example of a Data Control Module employed in accord with the principles of the present invention to control the input of data to a database and the manipulation of that data;

DETAILED DESCRIPTION OF THE INVENTION

Figure 1:
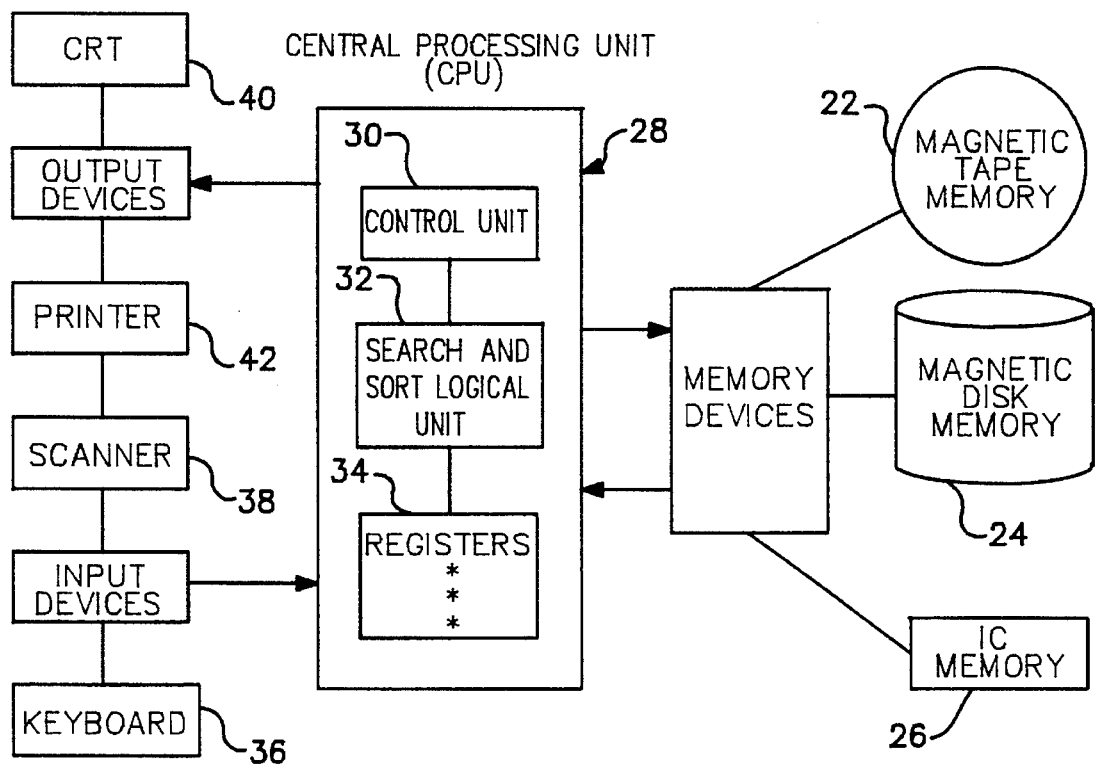
FIG. 1 is a schematic view of one representative computer for managing data in accord with the principles of the present invention; this computer has input and output devices, storage devices, memory devices, and a central processing unit.

Referring now to the drawing, it was pointed out above, that the present invention relates in one aspect to novel, computer-based systems for managing large sets of source data by way of an approach which uses only two necessary and essential data elements in a database management system that generates a single ordered file. FIG. 1 depicts one representative system 20 for managing data in the manner just described. That system includes one or more memory devices such as the illustrated magnetic tape and magnetic disk memory devices 22 and 24. The memory device provides a data file storage area.

System 20 also has: an IC (integrated circuit) or other memory device 26 supplying a data manipulation area; a central processing unit (CPU) 28 with a control unit 30, a search and sort logic unit 32, and registers collectively identified by reference character 34; input devices such as a keyboard 36 and/or scanner 38; and one or more output devices such as the illustrated monitor 40 and/or printer 42. Although any number of currently available processors can serve as the rearrangement CPU, the Intel 8086/88 family of microprocessors is particularly well suited.

As discussed above, the '834 application, now U.S. Pat. No. 5,303,367, discloses certain novel methods for managing data. Among the features which, alone and in combination, constitute and make those novel methods unique are:

Generic Data Structure (consisting of two generic data elements and a generic data set array)

Indentured Relationships

Inversion of Data Set Relationships

Dynamic Reorganization of Data Sets

Data Control Module

These features and the roles they play in data management are described in detail below.

GENERIC DATA STRUCTURE—DATA SETS

Figure 2:
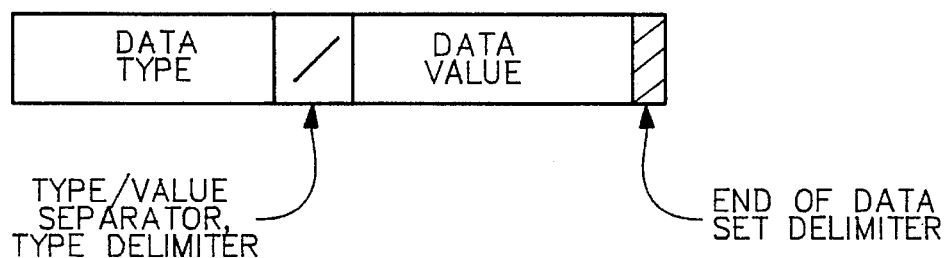
FIG. 2 is a diagram depicting the structure of a Data Set employed by a computer in managing data in accord with the principles of the present invention.

Referring now to FIG. 2, it was pointed out above that the data management methods disclosed in the '834 application, now U.S. Pat. No. 5,303,367, employ a model (the CCM) which is unique in that it replaces data fields and separate field name files with a single entity called a Data Set. This entity consists of two integral (inseparable), generic, variable length data elements -- Data Type and Data Value --; and it may have additional data elements. These may be useful but are not essential.

The Data Type is a designator used to differentiate one type of subject matter from another; e.g., teacher from student from course grade, etc. The Data Type is a user-specified name, acronym, or abbreviation used to define a particular subject matter, much the same way that a field name defines the data in a conventional record structure. However, unlike a field name in conventional database structures, the Data Type is itself a piece of processable data. The Data Type can accept any variable length alphanumeric or binary data, regardless of subject matter (i.e., it is subject matter (data) independent). The Data Type is delimited by a unique character or binary number to separate it from the Data Value.

The Data Value is the value of a particular Data Type. The Data Value differentiates one instance of a Data Type from all other instances of that Data Type in the database; e.g. [1655 SE 102] AND [120 ELM STREET] are unique Data Values for Data Type [ADDRESS]. The Data Value is subject matter (data) independent and can accept variable length alphanumeric or binary data such as text data or numbers, image data, voice data, or any other data which can be represented by a string of binary numbers. The Data Value is delimited by a unique character or binary number to indicate first the end of the Data Value and subsequently the end of the Data Set.

Each Data Set consists of a unique, dynamically defined instance of the Data Type/Data Value construct. Unlike other systems, this combination is always stored and processed as a composite unit. The structure and definition of the Data Type and its associated Data Value are encapsulated within the Data Set. The processing of Data Sets is thus independent of and protected from the structure of the source data. Such a strategy eliminates the complexity inherent in other large databases that contain many different types of source data.

The CCM thus provides a self-describing database that carries the definition of the source data as well as the value of the source data in a single composite Data Set; e.g., [NAME/JOHN DOE]. A Data Set is subject matter (data) independent and can accept variable length alphanumeric data in both the Data Type portion and Data Value portion. The Data Set is roughly comparable to a data record in a conventional database management system (DBMS) because Data Sets may be regarded as "generic" records. The term Data Set is used instead, however, because the software or other mechanism that processes a list of Data Sets need not know ahead of time the type of data contained in the single generic (i.e., data-independent) record structure that it is processing. Instead, when it reads the Data Set, it determines the Data Type.

Although not required, the generic Data Set can contain additional user-defined generic data fields in addition to the Data Type and Data Value fields. These fields are always defined in the third and subsequent position of the generic Data Set as the Data Type and Data Value fields positions are fixed. An example of an optional additional generic data field is a variable length DESCRIPTION text, this field providing additional descriptive data for a given Data Set; e.g.:

Data Type: Course

Data Value: ACCT-103

Description: Introduction to principles of Cost Accounting.

The physical notation [DATA TYPE/DATA VALUE] will be used to describe Data Sets throughout the discussion which follows.

DATA SET ARRAYS AND INDENTURED RELATIONSHIPS

Today, all computer-based business records are based on a standard data structure in which characters are grouped into fields which are in turn grouped into records. Whether the data is structured for file or database processing, it is always grouped into records. As noted, sometimes terms that are synonymous with record are used. Such synonyms include segment, tuple (theoretical relational model), and row (commercial application of the relational model).

The CCM of the data management systems and methods disclosed herein and in the parent application departs substantially from this way of relating data. Specifically, no record construct for data relationships is defined. Instead, Data Sets are indentured to other Data Sets in Data Set Arrays. The indenturing feature provides a hierarchy of Data Sets within an Array. Thus, no additional data elements or pointers are required to allow for an endless set of source relationships.

A Data Set Array is a variable length, hierarchically structured list of Data Sets. An exemplary Data Set Array of manufacturer data is:

[MFR/GE]
- [LOCATION/SEATTLE, WA]
- [MFR-PN/82A-26]
-- [COST/30.00]
-- [NSN/12345678]
--- COST/24.00]
-- [SUP/PORTLAND PARTS]
--- [SUP-PN/26-82A]
---- [COST/42.35]
-- [SUP/SEATTLE PARTS]
--- [SUP-PN/AAA-1]
---- [COST/27.35]
- [PHONE/456-1234]

This Data Set Array is mapped into linear address space in memory and to formatted physical subdivisions of real recording media as contiguous strings (see FIGS. 3 AND 4). Data Sets within the Data Set Array are delimited by end-of-Data-Set delimiters and/or start-of-Data-Set hierarchy designators. These delimiters and designators can be any unique character or binary number.

Depending on its position in the hierarchy of a Data Set Array, a Data Set is considered to be either a Key Data Set or a Linked Data Set. By definition, a Data Set Array consists of a single Key Data Set and zero or more indentured, Linked Data Sets making up a hierarchy within the Array.

Key Data Sets are Data Sets used to access the database. A Key Data Set holds the "top" position in the hierarchy of a Data Set Array; all other Data Sets are subordinated to the Key Data Set in a Data Set Array.

Linked Data Sets are Data Sets describing the Key Data Set and holding any position subordinate to the Key Data Set in the hierarchy of a Data Set array; e.g.:

[MFR/GE] Key Data Set
- [LOCATION/SEATTLE, WA] Linked Data Set
-- [ADDRESS/165SE10] Linked Data Set
- [PHONE/206-456-1234] Linked Data Set The above notation showing physical indentation and dashes (-) as the hierarchy delimiters is used to illustrate Key Data Set and Linked Data Set associations throughout this specification.

Linked Data Sets in a Data Set Array may describe the Key Data Set directly; i.e., [LOCATION/SEATTLE, WA] and [PHONE/206-456-1234] directly describe [MFR/GE]; or they may describe the Key Data Set indirectly; i.e., [ADDRESS/165SE10] describes [MFR/GE] only via the intermediate Linked Data Set [LOCATION/SEATTLE, WA]. [ADDRESS/165SE10] links to and thus describes [MFR/GE] but only relative to and by way of the [LOCATION/SEATTLE, WA] Data Set. In other words, all Linked Data Sets in a given Data Set Array, regardless of the level of the hierarchy at which they exist, describe the Key Data Set. Each Linked Data Set describes the Key Data Set by its exact location within the hierarchy as delimited by hierarchy designators (it should be noted that these hierarchy designators normally denote hierarchy by the number of such designators leading the Linked Data Set; i.e., if one designator leads the Linked Data Set, it is one level below the Key Data Set, if two hierarchy designators lead the Linked Data Set, it is two levels down, etc.). Use of this approach does not restrict encoding other data in the hierarchy designator such as a specific value assigned to this hierarchy designator to denote relationship direction or relationship type or weight. This approach differs substantially from the conventional record structure where each field is directly subordinate to the key field, making all fields other than the key field exist at one and the same level. Additional data elements are then required in conventional databases to interrelate fields within any one record.

In the generic Array depicted in FIGS. 3 and 4, as in all CCM Arrays, there is no structure resembling a conventional record. The only grouping of Data Sets that exists within the database is the Data Set Array in its entirety. The CCM is the only model that groups data in this way. The unique result is that the source data, the source data relationships, and the source data description are all contained in any one Data Set Array.

The CCM is based upon a strategy for representing data relationships that is new and different from strategies used to date. All existing schemes involve separate data indexes or dictionaries to identify source data relationships or pointers to maintain relationships among records. In the CCM, relationships are defined as existing between Data Sets in a hierarchically structured Data Set Array and not between conventional records which contain many data elements in a linear relationship.

INVERSION OF USER INPUT (see FIG. 5)

The Key Data Set is used to locate a Data Set Array; and, as such, it acts as the search key. In order to maximize access to data in Arrays, the systems and methods of the present invention use CCM to create the inverse relationships between Key Data Sets and Linked Data Sets within any Array. This methodology is called Inversion in this specification, and it is distinctly different from inverted indexes in conventional databases. In preferred embodiments of this invention, data entry is performed by first selecting a Key Data Set, displaying the associated Data Set Array with all Linked Data Sets shown in hierarchical order, and then selecting a position in the displayed hierarchy to insert a new Data Set having the data to be entered. When the Data Set is entered into the database, Inversion creates an inverse key-link relationship by automatically creating (or updating) a Data Set Array with: (a) the entered Data Set as the Key Data Set, and (b) the original Key Data Set and any direct intermediate Linked Data Set predecessors which are higher in rank to the newly entered Data Set in the hierarchy making up the original Array as the new Linked Data Sets (parents, grandparents, etc.), those new Linked Data Sets being inverted to form inverse relationships. Only the Data Sets in the original Data Set Array hierarchy that are above the newly entered Data Set are inverted. By employing Inversion, access to any array can be obtained via any Data Set input to the system, by direct search of the Key Data Sets, and by display of the Data Set Array.

Consider, for example, the [MFR/GE] Data Set Array:
[MFR/GE] Key Data Set
- [LOCATION/SEATTLE, WA] Linked Data Set
-- [ADDRESS/165SE10] Linked Data Set
- [PHONE/206-456-1234] Linked Data Set The Data Set Array created by Inversion of [LOCATION/SEATTLE, WA] at the time it is input (linked) to the Key Data Set [MFR/GE] is:
[LOCATION/SEATTLE, WA] New Key Data Set
- [MFR/GE] Linked Data Set The Data Set Array created by input and Inversion of [PHONE/206-456-1234] is:
[PHONE/206-456-1234] New Key Data Set
- [MFR/GE] Linked Data Set The Data Set Array created by input and Inversion of [ADDRESS/165SE10] is:
[ADDRESS/165SE10] New Key Data Set
- [LOCATION/SEATTLE, WA] Linked Data Set
-- [MFR/GE] Linked Data Set Notice that the intermediate original Linked Data Set [LOCATION/SEATTLE, WA] maintains a linked intermediate position in the new [ADDRESS/165SE10] Data Set Array.

Every unique Linked Data Set also exists as the Key Data Set in a Data Set Array. This enables access to all explicit relationships in the database directly; no derivation of the relationships is required.

The Inversion process also integrates under a common Key Data Set all Data Sets from all Arrays that contain a common Linked Data Set. For the part manufacturer example, if Data Set Arrays:

[MFR/GE] Key Data Set
- [LOCATION/SEATTLE, WA] Linked Data Set
and
[MFR/WE] Key Data Set
- [LOCATION/SEATTLE, WA] Linked Data Set are entered with the common Linked Data Set [LOCATION/SEATTLE, WA]. Inversion creates the following Data Set Array:
[LOCATION/SEATTLE, WA] Key Data Set
- [MFR/GE] Linked Data Set
- [MFR/WE] Linked Data Set The process of inverting each input link automatically creates a contiguous connection among all of those Data Set Arrays in the database which have a common link. In the above example, an implicit relationship is established between [MFR/GE] and [MFR/WE] through the common connection with [LOCATION/SEATTLE, WA]. The term "implicit relationship" means that there is a common relationship between the two manufacturers and the location but that this relationship is not dependent upon the existence of the other manufacturer. On the other hand, the act of indenturing (linking) one Data Set to another Data Set establishes an explicit or conditional relationship. In this case, any change to the indentured relationship would cause an equal change in the explicit relationship which is contained in the inverted Key Data Set Array.

DYNAMIC REORGANIZATION OF DATA SET ARRAYS

Data Set Arrays are stored in a logical sequence in a single file in systems and by methods employing the principles of this invention and maintained in a logical order such as hashed key or alphanumeric in storage and in the data manipulation area (memory) by Key Data Set (Data Type and then, subordinately, Data Value). Within Data Set Arrays, all Linked Data Sets are physically stored in hierarchical alphanumeric order. This structure provides rapid access to all Data Set Arrays and Data Set relationships in the database since source data is always in order. The following examples illustrate several Data Set Arrays arranged in logical order.

Key Data Sets Linked Data Sets

[LOCATION/TACOMA, WA] - [ ] -- [ ] --- [ ] . . .

[MFR/GE] - [ ] -- [ ] --- [ ] . . .

[MFR/WE] - [ ] -- [ ] --- [ ] . . .

[MFR-PN/655ABC] - [ ] -- [ ] --- [ ] . . .

[MFR-PN/82A-26] - [ ] -- [ ] --- [ ] . . .

Note that each of the Key Data Sets could have many Data Sets hierarchically linked to and indentured under it.

A Data Set Array with a Key Data Set and indentured Linked Data Sets in logical order is:

[MFR/GE] Key Data Set

- [LOCATION/SEATTLE, WA] Linked Data Set

- [MFR-PN/82A-26] Linked Data Set

-- [COST/30.00] Linked Data Set

-- [NSN/12345678] Linked Data Set

--- [COST/24.00] Globally Linked Data Set

-- [SUP/PORTLAND PARTS] Linked Data Set

--- [SUP-PN/26-82A] Linked Data Set

---- [COST/42.35] Linked Data Set

-- [SUP/SEATTLE PARTS] Linked Data Set

--- [SUP-PN/AAA-1] Linked Data Set

---- [COST/27.35] Linked Data Set

- [PHONE/456-1234] Linked Data Set

The single Data Set Array file and the order of all Linked Data Sets within all Data Set Arrays are both dynamically reorganized as the user enters new data or changes existing data. The Data Set Array File and all Linked Data Sets within a Data Set Array are always physically maintained in logical order to facilitate fast data retrieval and display. Initial input of Data Sets and all succeeding input is sorted and arranged in hierarchial order at the time of entry. Such reorganization is done by ordering Data Set Arrays in sorted order or by hashed key order and shifting and inserting Data Sets within Data Set Arrays in sorted order, using the generic rearrangement CPU 28 in system 20 (see FIG. 1).

Like sequential lists, Data Set Arrays may be grouped into blocks with growth space between them to allow for expansion of a Data Set Array without total rearrangement of the database.

DATA CONTROL MODULE (DCM)

Thus far, no restrictions are put on the possibility of all Data Sets in a Data Array being related to all other Data Sets. This allows for the existence of up to N Data Set Arrays with N squared possible links. The DCM, which is not mandatory, contains user defined and selected controls or constraints on the relationships that can be created among Data Set Arrays. In appropriate circumstances, this may make it possible to more easily create and manage the logical architecture of the Data Set Arrays that make up a database. When the DCM is enabled, it provides for the following and other features:

Allowed Data Types

Data Value Format Checks

Data Type Input Indenture Controls

Invocation (On-Off) of Inversion of Data Types

Figure 7:
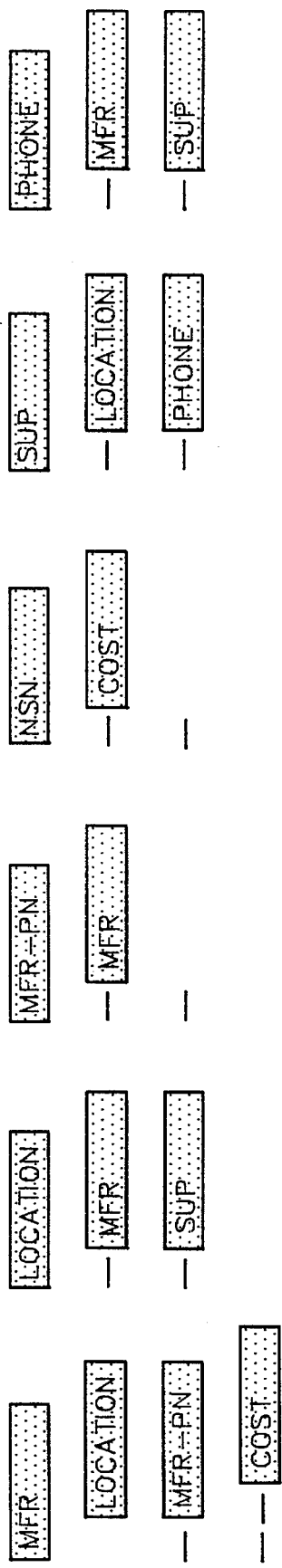
FIG. 7 diagrammatically depicts the Data Set relationships allowed by the Data Control Module in the representative example of FIG. 6.
Figure 8:
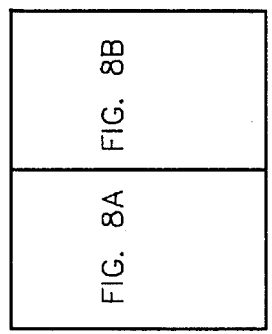
FIG. 8 comprising
Figure 8A:
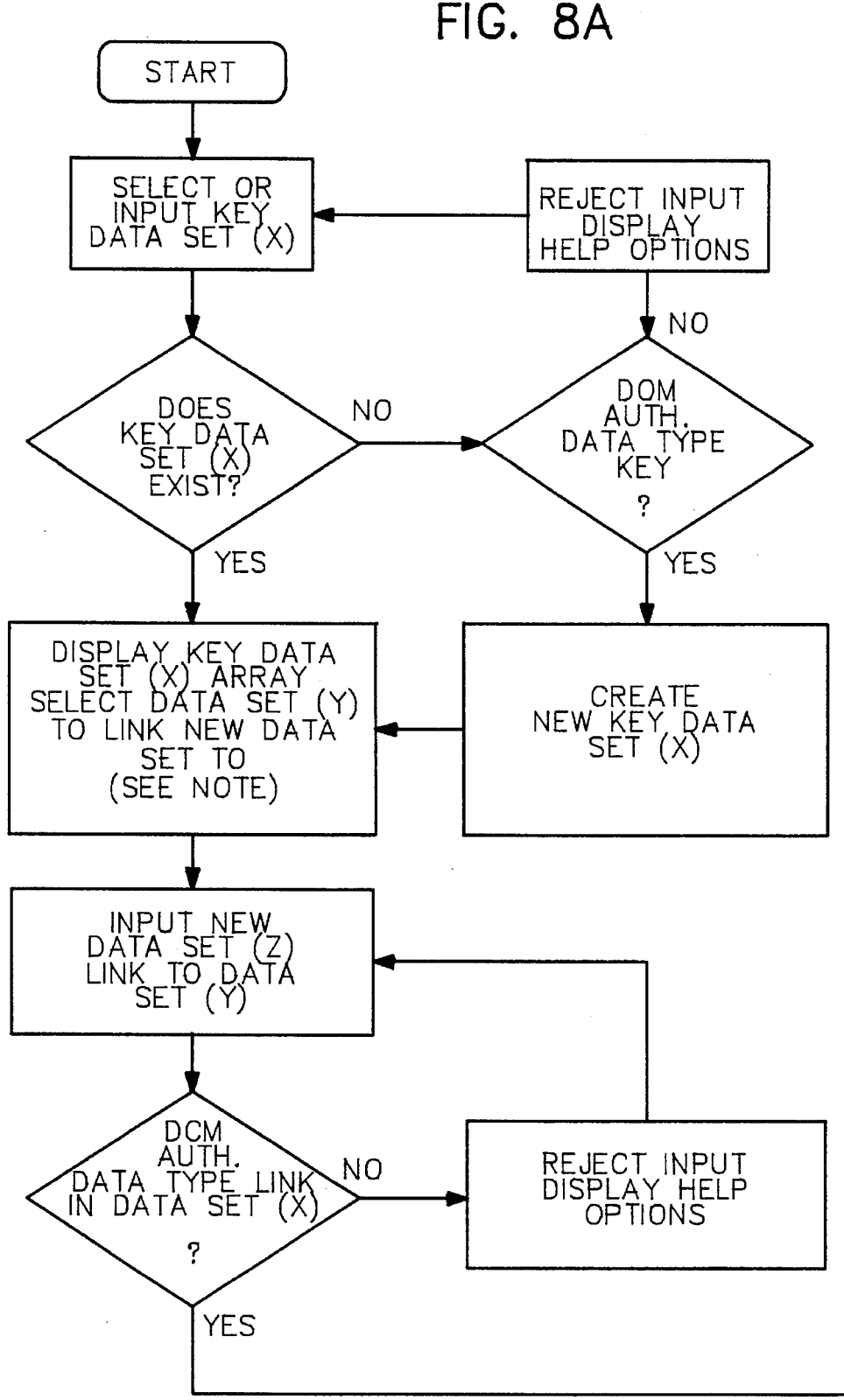
FIGS. 8A and 8B, is a flow chart of input/inversion and global linking processes carried out in managing data in systems and by methods employing the principles of the present invention.
Figure 8B:
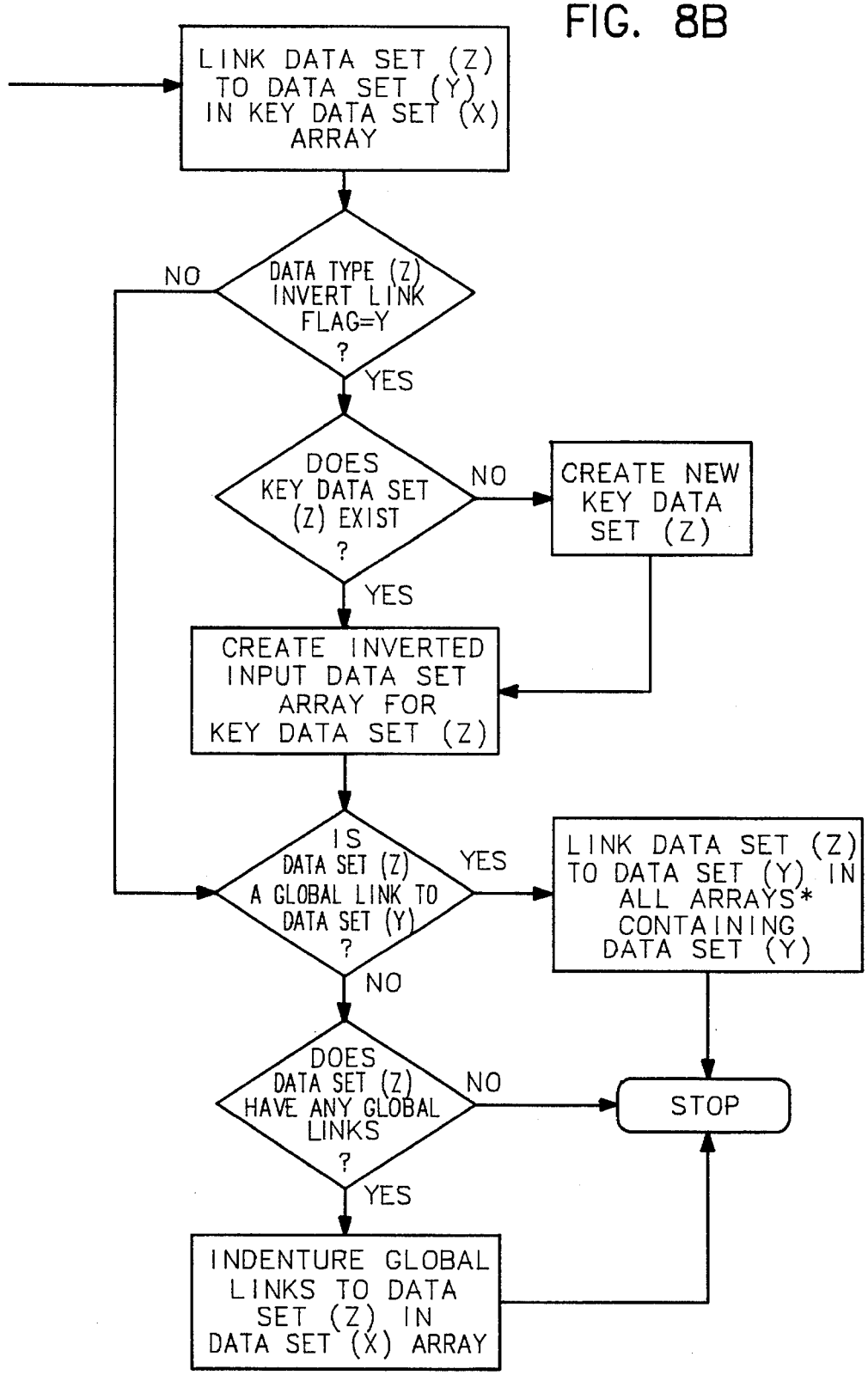

FIGS. 6 and 7 pictorially depict a typical DCM, and FIG. 8 shows how the DCM controls data input, inversion, and global linking.

The DCM rules (defined below) are embodied in a separate variable length file of Data Set rules. This set of rules can be organized as an indexed sequential or CCM configured file which is consulted by the computer at the time of Data Set input to the database.

Allowed Data Sets, Indenturing rules, and invocation of Inversion may be changed at any time, not just at initial system setup. For example, a new Data Type can be inserted at any level in an established Data Set Array hierarchy. As the new Data Set, consisting of a New Data Type and Data Value, is inserted in the array, all other levels of that array and all inverted arrays affected by this change are adjusted accordingly. It is important to note that the DCM does not define data types nor define relationships as conventional data dictionaries do, but instead puts constraints on possible relationships based on user-defined data constraints.

In addition to the functions discussed above, the data control module has the capability of defining selected Data Sets which should be globally linked. This results in a specified relationship being created between involved Data Sets for every occurrence of a particular Data Set in the file (database). The implementation of global linking is described in detail in the parent application to which the reader may refer, if desired.

Allowed Data Types

Acceptable Data Types are defined in the DCM. New Data Types can be added to the DCM at any time without any change to the database structure or software.

Data Type Input/Indenture Controls (Array Hierarchy)

Acceptable links between Data Types are defined through the DCM input and indenture controls. For example, it may be appropriate to link Data Type [COST] to Data Type [MFR-PN] but inappropriate to link Data Type [COST] directly to Data Type [MFR]. This constraint on relationships between Data Types would be defined in the DCM.

Data Type relationships are defined as acceptable only with certain Key Data Set Arrays. In the DCM shown in FIG. 6, for example, [NSN] is defined as an acceptable link to [MFR-PN] but only within Key Data Set Arrays having [MFR] as the Key Data Type. This signifies that [NSN] depends on both [MFR-PN] and [MFR]. On the other hand, [PHONE] can be directly linked to [MFR] within [MFR] Key Data Set Arrays, indicating that the relationship between [PHONE] and [MFR] is independent of all other Data Types defined in this example. As a part of the system setup process, the user should define the Data Types (others can be added at any time) and also consider data relationships and dependencies to determine the best strategy for entering and managing the data. By controlling the linking or indenturing of Data Types, the DCM controls the allowed hierarchy of each Data Set Array and, thus, the relationships throughout the entire database.

Invocation (On-Off) of Inversion of Data Types

Turning Inversion "on" or "off" for a Linked Data Type is controlled through the DCM. With inversion "on" for a Data Type, input of a Linked Data Set with the identical Data Type results in a new or updated inverted Data Set Array with the Key Data Set equal to the input Linked Data Set. With inversion "off" for a Data Type, computer generated inverse Data Seta Arrays will not be created as a part of the input process. For example, a user may not want to invert Data Type [COST] because [COST] is linked to many Data Types from [NSN] to [MFR-PN] and other Data Types with cost. In this case, a user would always want [COST] information relative to one of these other Data Types say, [MFR-PN], and thus would first access by Data Type [MFR-PN].

Composite Views

The '834 application, now U.S. Pat. No. 5,303,367, discloses a mechanism for creating a composite view of CCM data which is termed Automatic Projection Connection.

Data management as described in the '834 application allows a separate list of Key Data Sets to be easily made available. That list makes possible the efficient creation of other composite views of the CCM data. As described in the '834 application, now U.S. Pat. No. 5,303,367, Key Data Sets are stored in the database at the start of each Data Set Array; and the end of each Data Set Array is delimited by an End-Of-Data-Set-Array delimiter to distinguish it from other Data Set Arrays. Therefore, the first Key Data Set is at the beginning of the database; and each succeeding Key Data Set occurs after each End-Of-Data-Set-Array delimiter. Using this information, a list of the Key Data Sets can be easily created by a one-time read and search of the CCM Data Set Array database for the Key Data Sets. This list of Key Data Sets can be maintained by adding new Key Data Sets to the Key Data Set List (or "key list") as new Data Set Arrays are entered into the CCM database and by deleting Key Data Sets from the list only when the associated Data Set Array is deleted from the CCM database. The list can be stored in memory in a manner such as a sorted list or as a Btree list.

The efficient creation of other composite views of the CCM data is also aided by the controls in the Data Control Module which indicate the allowed relationship hierarchy to which Data Types are subject and identify which Data Set Array Types are "input" types. Input Data Set Array (DSA) types are those which are primitive; i.e., those from which all inverted Data Set Arrays are created. Accordingly, each Data Set Array is either an input type or is automatically created by the Inversion Process. In the present application, arrays input by the user are called "Input Arrays", and they have an "Input DSA Data Type". Arrays created by Inversion are called "Inverted Arrays"; they have an "Inverted DSA Data Type". All Input and Inverted arrays have a Key Data Set with a Data Type corresponding to the corresponding DSA Data Type.

One additional Data Type employed in the present invention is the Non-inverted Data Set Type. This data type is linked under an Input Data Type but is not inverted and exists only in the input Data Set Array. Hence, it has no corresponding inverted Data Set Array nor a Key Data Set.

CONNECTION VIEWS BY QUERY (CVQ)

One important and representative method for generating a composite view of the data in a CCM is the CVQ. The Connection View by Query seeks and projects any direct and/or indirect Data Set connections, relative to and based upon selection criteria defined by the user, that may exist in one or more Data Set Arrays.

The CVQ process, illustrated in FIGS. 9, 10, 11, and 12, provides a query entry box in which the user can specify the Data Types, Data Values, and/or Data Sets and the selection criteria relationships. Selection criteria relationships are those common to standard query languages, such as SQL, between the items that are desired to be searched for, and viewed. These query criteria include such items as "greater-than", "less-than", "equal-to", "containing", "not-equal-to", "and", "or", "by", etc. The user is also asked if intermediate relationships are to be viewed and if the query is to be saved in a file for future reference. In either case, the query is saved temporarily in memory for use in formatting the view to be displayed. The goal for which the CVQ is employed is the optimization of the query through use of the DCM and the key list prior to reading any Data Set Arrays from the CCM database in order to minimize database reads.

Once the Data Types, Data Set Values, Data Sets, and selection criteria are defined, the CVQ searches the DCM-allowed hierarchy rules for each Data Type defined in the query to determine if the types are: primitive "input" Data Set Array (DSA) types, are linked in an input Data Set Array as inverted DSA types, or are non-inverted Data Set Types. Four possibilities exist:

(a) All Data Types defined in the query are Input DSA Types.

(b) All Data Types defined in the query are Inverted DSA Types.

(c) All Data Types defined in the query are neither Input DSA types nor Inverted DSA types; i.e., they are Non-inverted Data Set Types.

(d) Data Types defined in the query are a mixture of Input DSA Types, Inverted DSA Types, and Non-inverted Data Set Types.

For each case, CVQ searches the key list for Key Data Sets with Data Types and Data Values which conform to the selection criteria and builds a set of separate key lists for each defined selection criterion. These lists of keys are used for further search and for reading selected Data Set Arrays for further search or analysis.

CASE a: ALL INPUT DSA TYPES (FIGS. 9 AND 10, PATH (A))

a.1 If only one Input DSA Data Type is defined by the query, the key list is searched for Key Data Sets which meet all the selection criteria. A final list of keys is created for use in displaying the composite view.

a.2 If more than one Input DSA Data Type is defined by the query, the possibility exists that the Data Sets of each type are related via an intermediate direct or indirectly connected Data Set. In this case, the DCM entry for each Input DSA Data Type is searched for all allowed Linked Data Types, and a list is created of Linked Data Types common to all of the related Data Sets. This results in three possibilities.

(a.2.1) If there are no Data Types in the common list, there are no composite relationships. However, there may be a simple list of items which meet the criteria. Accordingly, in a manner like that employed in the case a.1 procedure, the key list is searched for Key Data Sets which meet all the selection criteria. A final list of Key Data Sets is created for use in displaying the composite view.

(a.2.2) If none of the Data Types in the common list is inverted, an exhaustive search of the CCM database is required; and the user is so advised. If the user desires, this search of all Input Data Set Arrays that contain the common Linked Data Types, as defined by the DCM, is made. A final list of keys is created for use in displaying the composite view.

(a.2.3) One or more common, inverted, linked types: if one or more of the Data Types in the common Linked Data Types List is an Inverted Data Type, a count of the common inverted DSA Data Sets that meet the query criteria is made by Data Type; and a sum of the total number of Inverted DSA Data Sets meeting the criteria is saved. Then, a similar count of the Input DSA Key Data Sets in the key list that meet the query criteria is made by Data Type; and a sum of the total number of input DSA Key Data Sets meeting the criteria is saved.

Since there is no way of knowing which, if any, of the common Inverted Data Set Arrays contain Input DSA Key Data Sets that meet the query requirements, or if any of the Input Data Set Arrays has Inverted DSA Data Sets that meet query requirements, a choice must be made as to whether to read each of the Inverted Data Set Arrays in the list or to read each of the Input Data Set Arrays in the Data Set Array lists. This decision is based on the relative size of the two sets of Data Set Array key lists. If the list of Inverted Data Set Array keys has a smaller total count, each of the Inverted Data Set Arrays in the key list is read and searched for Input Data Set Arrays which are in the lists and meet the query selection criteria. Otherwise, the actions are reversed; and the Input Data Set Arrays are read and searched for Inverted DSA Data Sets in the Inverted Data Set Array key list. For brevity, the search based upon a reading of the Inverted Data Set Array key list is described below. For the other case, the roles of Input DSA keys and Inverted DSA keys are reversed.

In order to minimize CCM file reads and searches, a two-step search process is employed. First, the Data Set Arrays in the Inverted DSA key list are read; and the number of links in each Data Set Array are counted. This is a relatively rapid process since only a link count is performed, and this is done by counting the delimiters which separate the Linked Data Sets. No search for specific Data Sets is performed at this point. The count for each inverted DSA Key Data Set is saved, and the key list is sorted by increasing count.

Once this ordered list is established, the second step of the process is performed. The Inverted Data Set Array with the smallest total link count is searched first for all Input DSA Key Data Sets which meet each applicable selection criteria, and a separate list is made of the results. If intermediate links are found between the root (key) and the Data Set being searched for, and if the user specifies the desire to view the intermediate links, the intermediate Data Sets from the root out to and including the found Data Set are also saved (but not used in any further searches). Two search paths, based on "AND" logic and "OR" logic, are required for the second step of the search.

"AND" LOGIC SEARCH

The search is continued with the Inverted Data Set Array having the next smallest link count in the Inverted DSA key list. The thus identified array is read and searched for Data Sets found in the previous search. If no Key Data Sets are found and the selection criteria is "AND" logic, the search is complete; and the user is advised that the composite view has no Data Sets that meet all the criteria. Otherwise, the results of this search are compared to Data Sets in the previous list; and a new shortest list is created and used to continue the search. If intermediate links are found between the root (key) and the Data Set being searched for, and if the user specifies the desire to view the intermediate links, the intermediate Data Sets from the root out to, and including, the found Data Set are also saved (but not used in any further searches). This search continues, reading additional inverted Data Set Arrays until no Key Data Sets are found that meet all the criteria or a final list is created of all Key Data Sets that meet the query criteria.

"OR" LOGIC SEARCH

The search is continued with the Inverted Data Set Array having the next smallest link count in the Inverted DSA key list. It is read and searched for Input DSA Key Data Sets meeting the query criteria. If intermediate links are found between the root (key) and the Data Set being searched for, and if the user specifies the desire to view the intermediate links, the intermediate Data Sets from the root out to and including the found Data Set are also saved. This search continues, reading additional inverted Data Set Arrays until all Data Sets are found that meet the criteria; and a final list is created of all Data Sets that meet the query criteria.

A final array of data sets is created for use in displaying the composite view.

CASE b: ALL INVERTED DSA TYPES (FIGS. 9 AND 11, PATH (B))

b.1 If only one Data Type is defined by the query, the key list is searched for Key Data Sets which meet all the selection criteria. A final list of keys is created for use in displaying the composite view.

b.2 If more than one Data Type is defined by the query, the possibility exists that the Data Sets of each type are related via an intermediate direct or indirectly connected Data Set. In this case, the DCM entry for each Input DSA Data Type is searched for Inverted Linked Data Types; and a list is created of Input DSA Data Types common to all. This results in two possibilities:

(b.2.1) If there are no Data Types in the common list, there are no composite relationships. However, there may be a simple list of items which meet the user's search criteria. Accordingly, as in the case b.1 process, the key list is searched for Key Data Sets which meet all the selection criteria. A final list of keys is created for use in displaying a composite view.

(b.2.2) One or more common Input Data Types: if there are one or more Inverted DSA Data Types in the common Input DSA Data Type list, a count of the common Input DSA Key Data Sets in the key list that meet the query criteria is made by Data Type; and a sum of the total number of Input DSA Key Data Sets meeting the criteria is saved. Then, a similar count of the Inverted DSA Data Sets in the key list that meet the query criteria is made by Data Type; and a sum of the total number of Inverted DSA Data Sets meeting the criteria is saved.

Since there is no way of knowing which, if any, of the Inverted Data Set Arrays contain Input DSA Key Data Sets that meet the query requirements, or if any of the common Input Data Set Arrays has Inverted DSA Data Sets that meet query requirements, a choice must be made as to whether to read each of the Inverted Data Set Arrays in the list or to read each of the Input Data Set Arrays in the respective lists. This decision is based on the relative size of the two sets of Data Set Array key lists. If the list of Inverted Data Set Array keys has a smaller total count, each of the Inverted Data Set Arrays in the key list is read and searched for Input Data Set Arrays in the lists of Key Data Sets which meet the query selection criteria. Otherwise, the actions are reversed; and the Input Data Set Arrays are read and searched for Inverted DSA Data Sets in the Inverted Data Set Array key list. For brevity, the search based upon reading the Inverted Data Set Array key list is described below. For the other case, the roles of input and inverted are reversed.

In order to minimize CCM file reads and searches, the search is in this case also made in two steps. First, the Data Set Arrays in the Inverted DSA key list are read; and the number of links in each Data Set Array are counted. This is a relatively rapid process since only a link count is performed; and this is made by counting the delimiters which separate the Linked Data Sets. No search for specific Data Sets is performed at this point. The count for each Inverted DSA Key Data Set is saved, and the key list is sorted by increasing count. Once this ordered list is established, the second step of the process is performed. In that step, the Inverted Data Set Array with the smallest total link count is searched first for all Input DSA Key Data Sets which meet each selection criteria applicable to the Input DSA Key Data Sets; and a separate list is made of the results. If intermediate links are found between the root (key) and the Data Set being searched for, and if the user specifies the desire to view the intermediate links, the intermediate Data Sets from the root out to, and including, the found Data Set are also saved (but not used in any further searches). Two paths, based upon "AND" logic and "OR" logic, are required for the second step of the search.

"AND" LOGIC SEARCH

The search is continued with the Inverted Data Set Array having the next smallest link count in the Inverted DSA key list. It is read and searched for Input Data Sets found in the previous search. If no Key Data Sets are found and the selection criteria is "AND" logic, the search is complete; and the user is advised that the composite view has no Data Sets that meet all the criteria. Otherwise, the results of this search are compared to Data Sets in the previous list; and a new "shortest" list is created and used to continue the search. If intermediate links are found between the root (key) and the Data Set being searched for, and if the user specifies the desire to view the intermediate links, the intermediate Data Sets from the root out to and including the found Data Set are also saved (but not used in any further searches). This search continues, reading additional Inverted Data Set Arrays until no Key Data Sets are found that meet all the criteria or a final list is created of all Key Data Sets that meet the query criteria.

"OR" LOGIC SEARCH

The search is continued with the Inverted Data Set Array having the next smallest link count in the Inverted DSA key list. It is read and searched for input DSA Key Data Sets meeting the query criteria. If intermediate links are found between the root (key) and the Data Set being searched for, and if the user specifies the desire to view the intermediate links, the intermediate Data Sets from the root out to, and including, the found Data Set are also saved. This search continues, reading additional Inverted Data Set Arrays until all Data Sets are found that meet the criteria; and a final list is created of all Data Sets that meet the query criteria.

A final array of data sets is created for use in displaying the composite view.

CASE c: ALL NON-INVERTED DATA SET TYPES (FIGS. 9 AND 12, PATH (C))

c.1 In this case, the DCM is searched for Input DSA Data Types that have the Non-inverted Link Data Types defined by the query. If none of the Data Types in the query list is inverted, an exhaustive search of the CCM database will be required; and the user is so advised. If the user desires an exhaustive search of all Input Data Set Arrays that contain the common Linked Data Types, the process continues by: (a) first searching the key list for the keys of the appropriate Input DSA types, (b) then reading the Data Set Arrays for which the keys are found, and (c) searching for the Linked Data Sets in each array that meet the query criteria.

A final array of data sets is created for use in displaying the composite.

Figure 9:
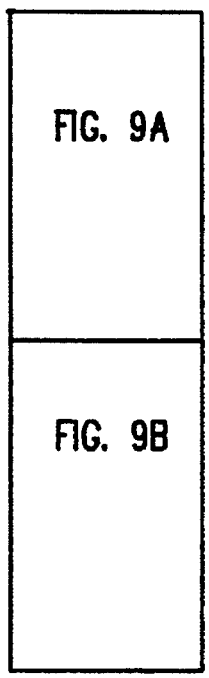
FIGS. 9, 10, and 11 respectively show the relationship between FIGS. 9A and 9B, 10A and 10B, and 11A and 11B; those figures, together with FIG. 12, constitute a flow chart of a Connection View by Query method which embodies the principles of the present invention and is employed to seek out and project direct and/or indirect data set connections based upon selection criteria defined by a user.
Figure 10:
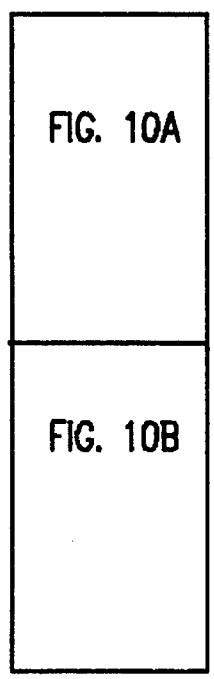
Figure 11:
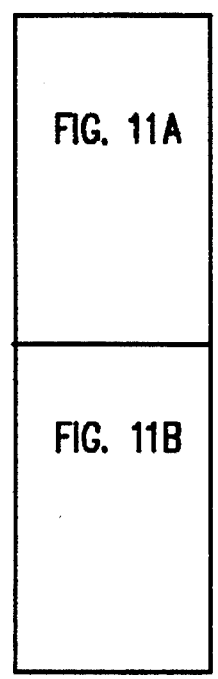

CASE d: A MIXTURE OF TYPES (FIG. 9)

d.1 In this case, the DCM entry for each Data Type is searched. If the Data Types in the query list are a mixture of Input, Inverted, and Non-inverted Data Types, the Data Types are first arranged into sets which meet the requirements of each of the above cases a, b, and c.

A final array of data sets is created for use in displaying the composite view based upon the joined results of the case a, b, and c searches.

VIEWING THE SEARCH RESULTS (FIG. 9)

If the results of the search are an empty list at any appropriate point in the process, the user is so advised; and the search is aborted. Otherwise, a temporary composite Data Set Array is created for the results of the search. The order in which the Data Sets and any intermediate Linked Data Sets are displayed is based upon the order in which the Data Sets are defined in the user query.

When the user completes the viewing of the composite Data Set Array, CVQ asks the user if the composite array is to be saved for future consultation. If the response is yes, the composite array may be saved to the CCM database under a predefined distinct Data Type such as "QueryResults" governed by DCM rules that do not allow inversion or change. Or the composite array can be saved to a separate file of the user's choice.

A representative example demonstrating the use of CVQ is one in which the user enters a request to view: (1) "all Data Sets containing a Data Type equal to 'CustomerName' and Data Set Values equal to 'SMITH' and 'SMYTH' with (2) all Data Sets equalling 'City/Seattle'". The DCM for this database indicates that the Data Types CustomerName and City are inverted types linked under the Input DSA Data Type:CustomerNumber in the form:

CustomerNumber

- Address

-- CITY

- CustomerName.

By the Inversion Process, it is known that Inverted Data Set Arrays:

CustomerName

- CustomerNumber and

CITY

- Address

-- CustomerNumber also exist.

The case b.2 process is employed. CVQ searches the key list for all CustomerNames and City that meet the query selection criteria; i.e., a list of CustomerNames containing "SMITH" or "SMYTH" and a single CITY equal to "SEATTLE". Since only one input DSA Data Type, CustomerNumber, is found to contain these data types, the key list is searched for all CustomerNumbers; and a count of each of the separate lists is compared. It is found that there are a large number of CustomerNumbers relative to the CustomerNames and CITY lists which meet the query selection criteria. Therefore, CVQ decides to read the Data Sets from the shorter list. Accordingly, the CITY/SEATTLE Data Set Array is read; and the number of Linked Data Sets under it is counted. The CustomerName Data Sets are then read and the total number of Linked Data Sets are counted and summed. The results indicate that there are fewer links in the CustomerName arrays to search for CustomerNumber than there are in the CITY Data Set Array. Accordingly, each of the CustomerName Data Set Arrays is searched for Input DSA Key Data Sets with the Data Type "CustomerNumber", and a list of these CustomerNumber Data Sets is made. The CITY/SEATTLE Data Set Array is then searched for CustomerNumber Data Sets in the search list. Matching CustomerNumbers are found linked to Address relative to CITY as shown by the Inverted Data Sets Array form set forth above. Based upon the user's requirements, the intermediate relationships are kept or not kept; and a final array of Data Sets is created. That array has the following form if intermediate links are kept:

CustomerName
- CITY
-- Address
--- CustomerNumber or the form:

CustomerName
- CITY if intermediate links are not kept.

A query request using a different order such as one to view "all Data Sets equal 'City/Seattle'" with related Data Sets containing a Data Type equal to 'CustomerName' and with Data Set Values containing 'SMITH' and 'SMYTH', would result in a composite array of the form:

CITY
- Address
-- CustomerNumber
--- CustomerName if intermediate links are kept or of the form:

CITY
- CustomerName if intermediate links are not kept.

EXTERNAL DATABASE BOND (EDB)

The EDB technology provides the ability to import relevant data into the CCM database from external relational databases and to export data from CCM to external relational databases.

Any CCM Data Set Array is mathematically equivalent to an outer-join of a set of relational tables. Accordingly, any Data Set Array can be decomposed into a set of relational tables or created from a set of applicable relational tables. The sequence of steps that follow describe how one Data Set Array can be exported or imported. These steps can be automated and repeated any number of times such that a full database of Data Set Arrays can be imported or exported.

EXPORT

Figure 13:
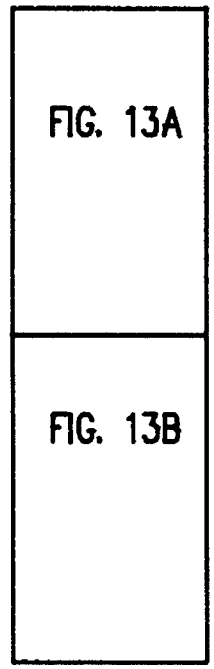
FIG. 13 shows the relationship between FIGS. 13A and 13B which, taken together, constitute a flow chart of a method, embodying the principles of the present invention, for exporting data to an external database.

The EDB export process is illustrated in FIG. 13. First, a Data Set Array is selected directly, or as the result of ACP or CVQ for display. The selected Data Set Array consists of a Key Data Set and indentured, related, Linked Data Sets arranged in a hierarchical manner. The Key Data Set acts as the root of the hierarchy, and the related Data Sets act as multiple level branches to the root. That end of each branch farthest from the root is a "leaf" Data Set. A hierarchy "path" consisting of all directly Linked Data Sets is traced from the root Data Set out to the leaf Data Set. That path consists of one, and only one, Data Set at each level of the hierarchy out to, and including, the leaf Data Set of that level.

The chosen Data Set Array is expanded in memory into a set of all paths. No path will be duplicated, and each leaf Data Set will be visited only once. The total number of paths will be equal to the total number of leaf Data Sets. Leaf Data Sets can be easily found since the Data Set after a leaf Data Set must have fewer hierarchy designators, and the last Data Set in a Data Set Array is a leaf Data Set.

For example, the Data Set Array:

CustomerNumber/0024
- Address/10 W St
-- CITY/SEATTLE
- CustomerName/A. Jones
- Phone/206-674-2022
- Phone/206-674-2688 would expand into four paths:

CustomerNumber/0024, Address/10 W St, CITY/SEATTLE

CustomerNumber/0024, CustomerName/A. Jones

CustomerNumber/0024, Phone/206-674-2022

CustomerNumber/0024, Phone/206-674-2688.

In actual practice, the hierarchy designators (dashes in the example) are not needed in the paths since each level in the path contains one, and only one, Data Set in the order from root to leaf. That is, each path is a list of distinct Data Sets in which successive Linked Data Sets from the root are assembled into an ordered set from root to leaf with one, and only one, Data Set at each level.

As EDB creates each of the paths, it makes a list of all of the Data Types that exist in the array and puts them into a Column Header List once for each type. The types in the Column Header List act as column headings in a non-normalized relational table as discussed below. In the above example, the Column Header List would be:

CustomerNumber, Address, CITY, CustomerName, and Phone.

After creating all paths and the Column Header List, EDB displays the Column Header List and asks the user for the order, if any, in which the Data Types in the Column Header List should be arranged. It arranges the Data Types in the Column Header List according to the user's response.

EDB then creates a non-normalized relational table, using the path and column header information in the following manner:

An empty relational table is created with one column for each Data Type in the Column Header List.

Each path is read in order; and each Data Set in the path is decomposed into a Data Type and a Data Value. Each Data Value is entered into the appropriate Data Type column. This continues until all data is entered into the table. Each path will be a separate row in the table. In the above example, the resulting table would be:

| CustomerNumber | Address | CITY | CustomerName | Phone |
|---|---|---|---|---|
| 0024 | 10 W. St. | SEATTLE | | |
| 0024 | | | A. Jones | |
| 0024 | | | | 206-674-2022 |
| 0024 | | | | 206-674-2644 |

Once the non-normalized relational table is created, two options are possible, subject to user request.

(1) Each row in the non-normalized table can be turned into a concatenated key of the non-null values, which define a set of fully normalized tables of the respective columns. In the above example, the first row would define a CustomerNumber*Address*CITY table with a key of 0024*10 W St.*SEATTLE, and the last two rows would define a CustomerNumber*Phone table with two keys: 0024*206-674-2022 and 0024*206- 674-2688.

(2) The non-normalized table can be decomposed into a set of normalized relational tables.

The normalized tables can be written out to separate files for manipulation by SQL or exported directly to the targeted external relational database in a format supported by that database.

IMPORT

Figure 14:
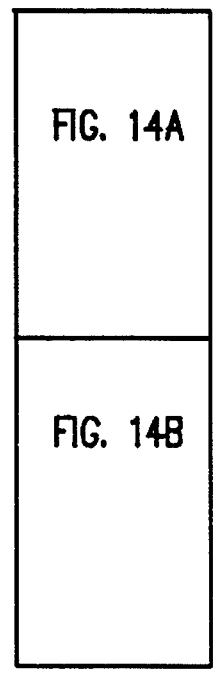
FIG. 14 shows the relationship between FIGS. 14A and 14B which, taken together, constitute a flow chart of a method for importing data from an external database in accord with the principles of the present invention.
Figure 9A:
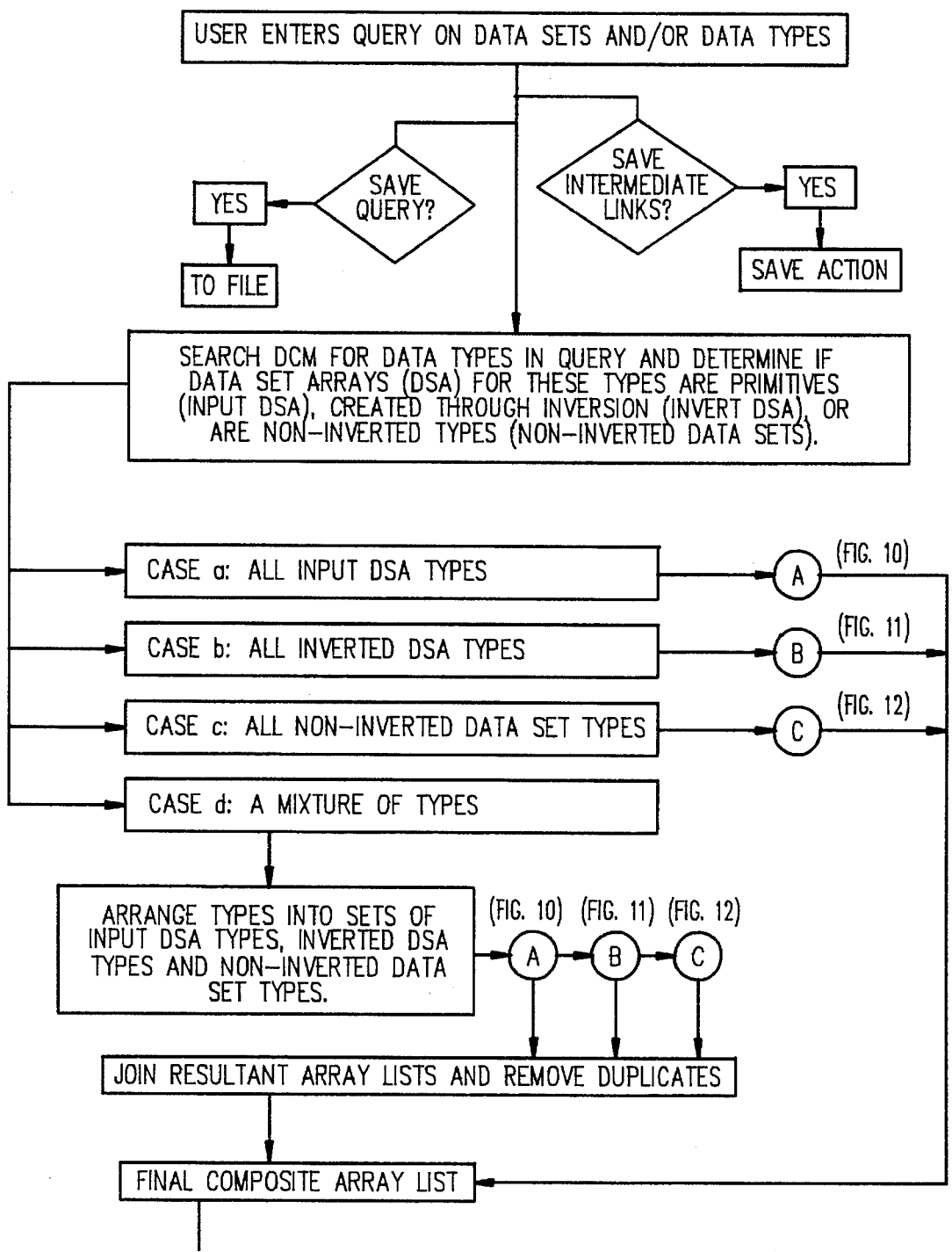
Figure 9B:
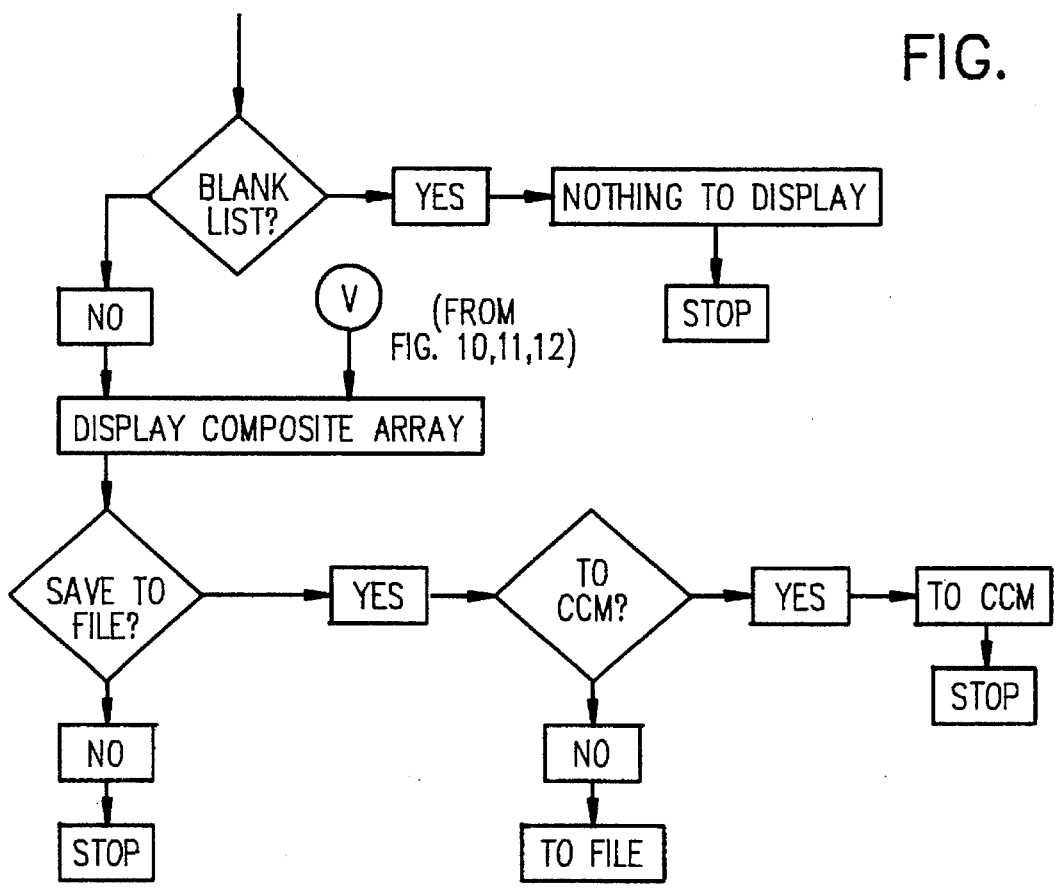
Figure 10A:
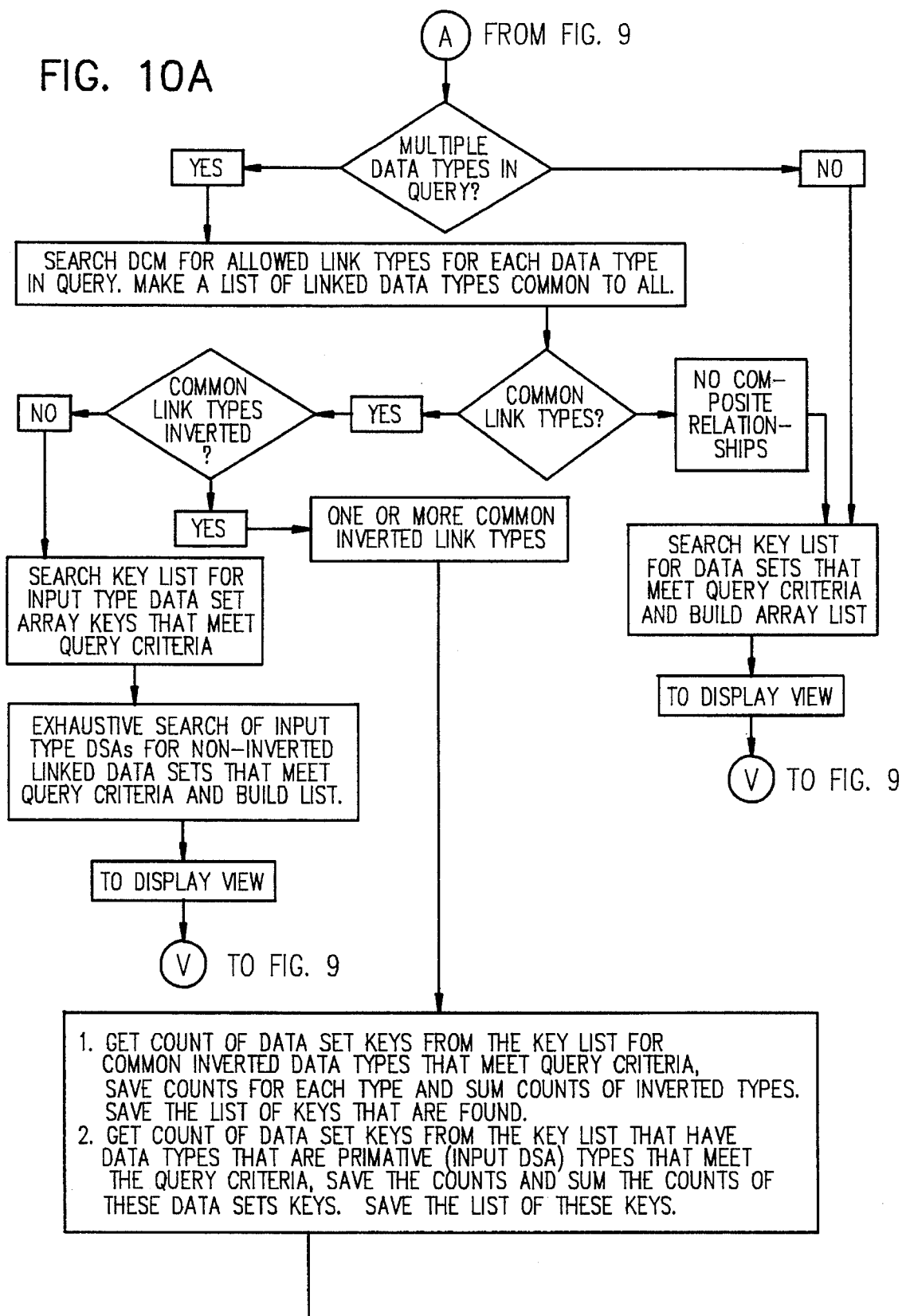
Figure 10B:
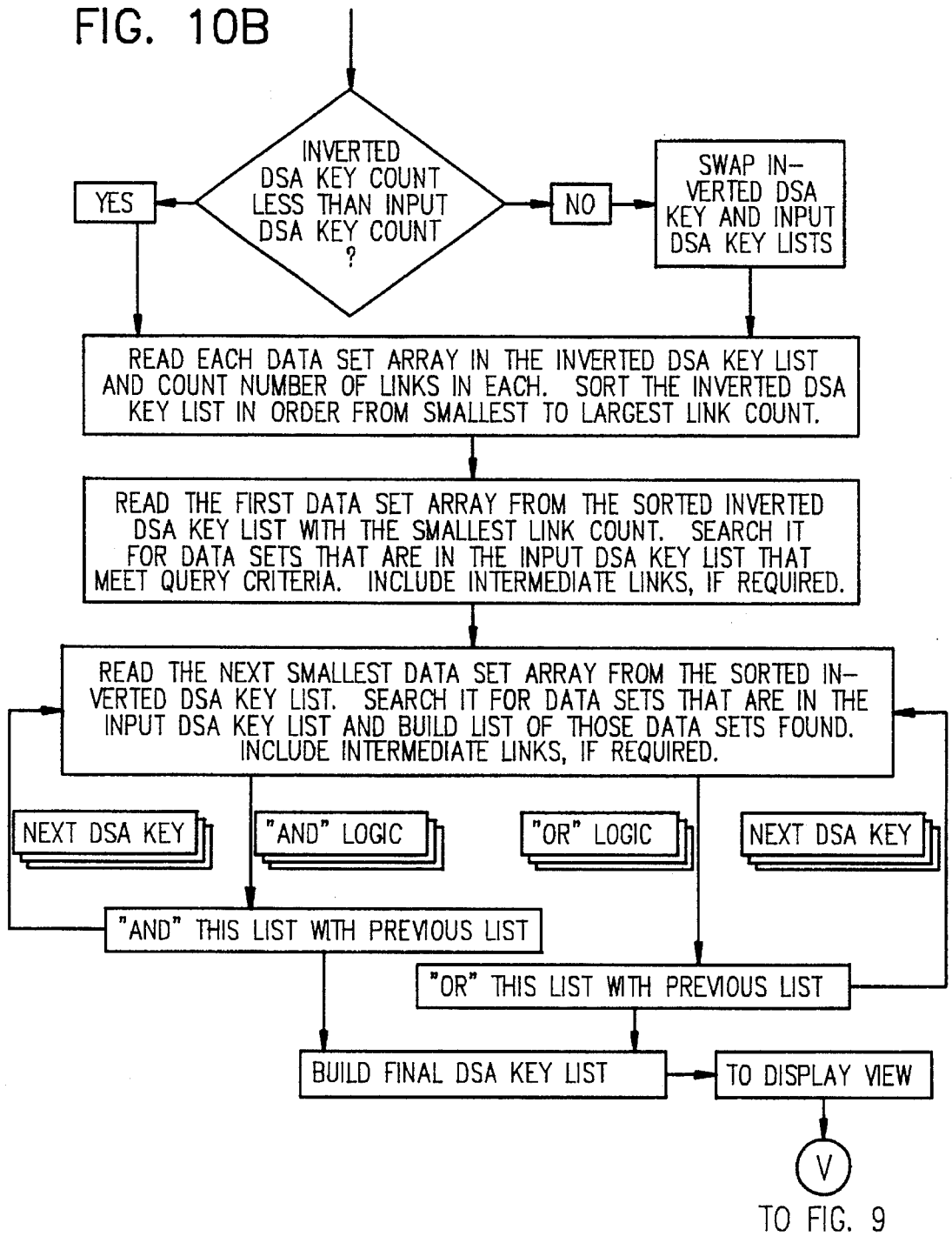
Figure 11A:
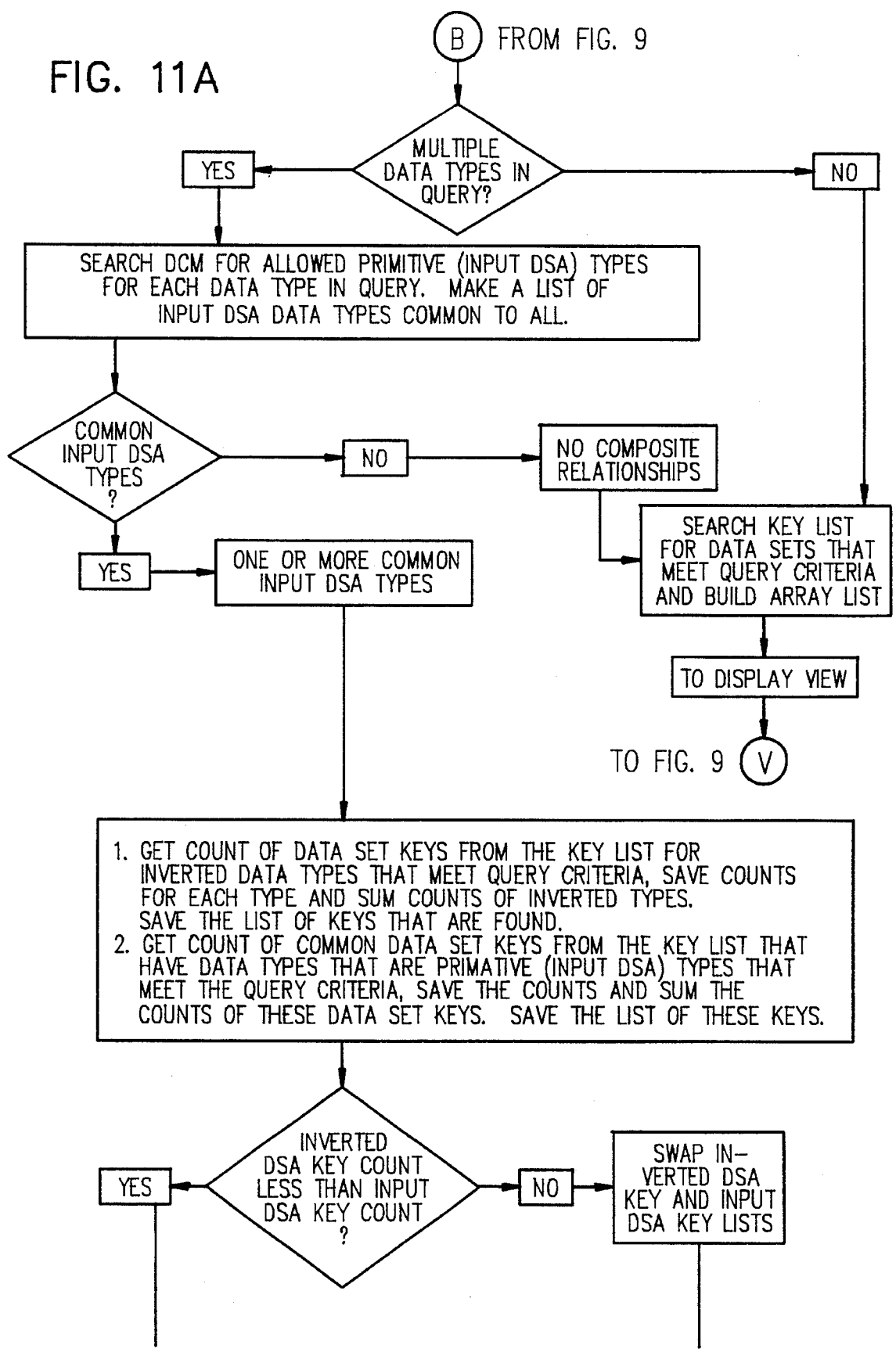
Figure 11B:
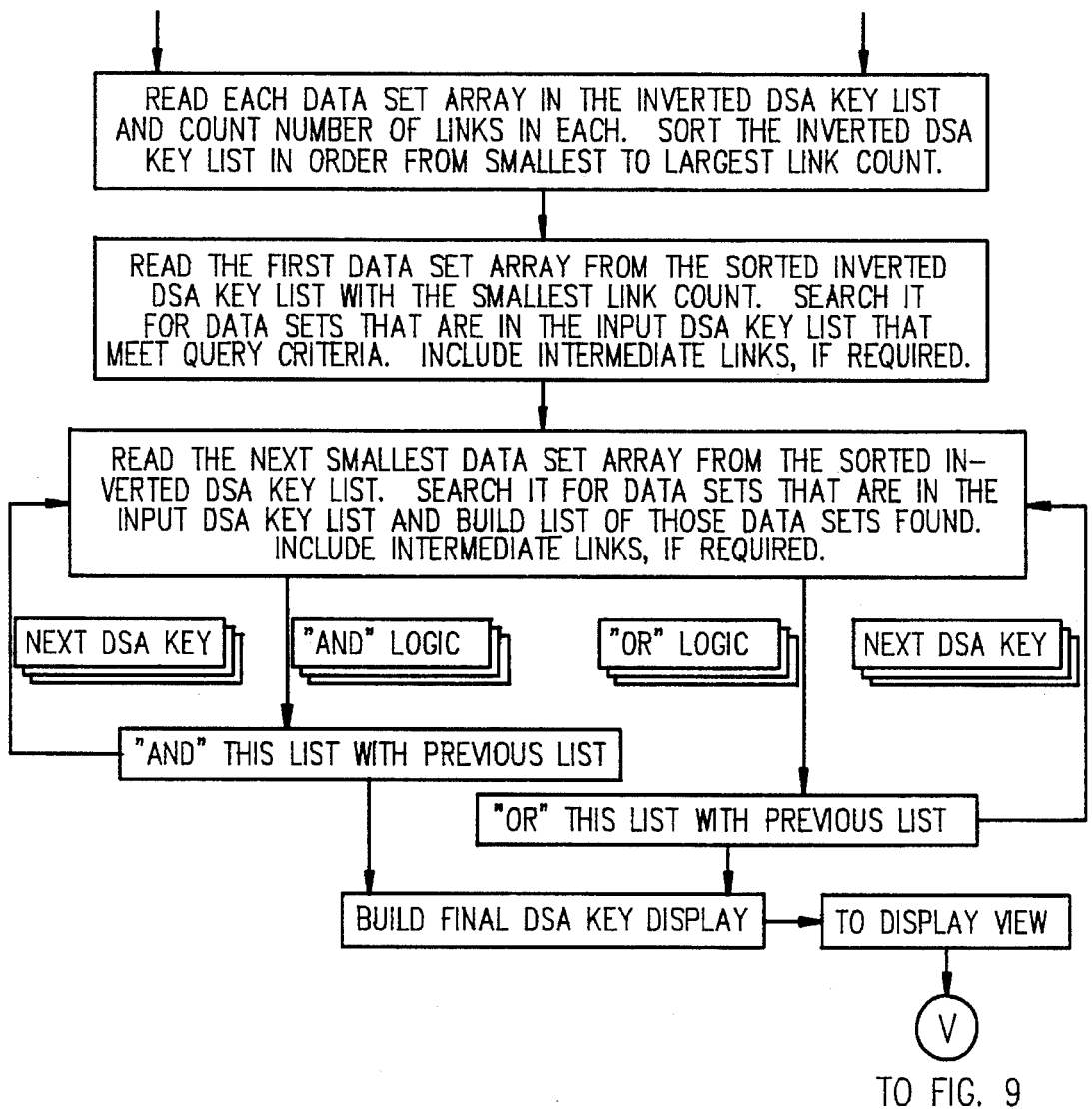
Figure 13A:
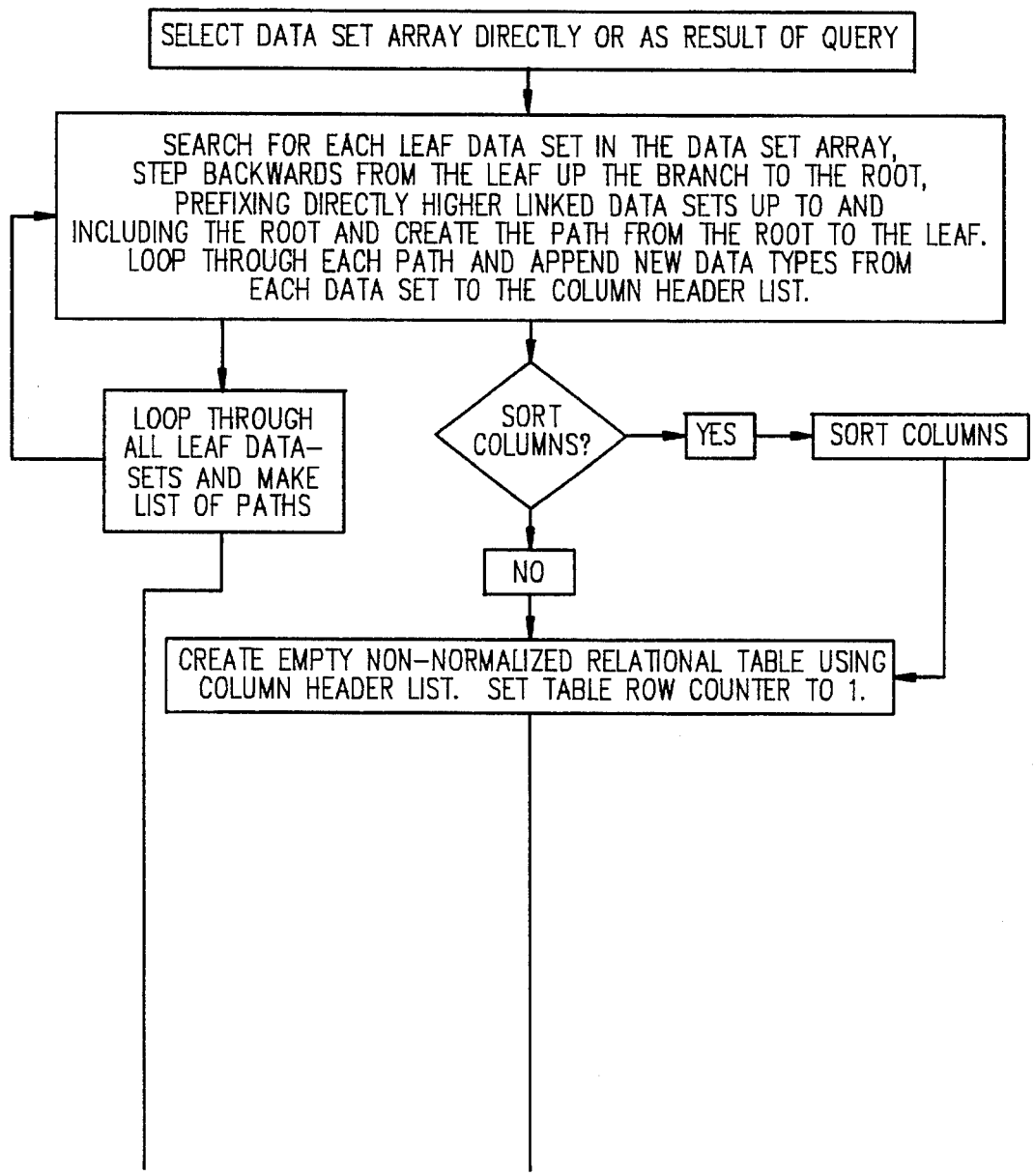
Figure 13B:
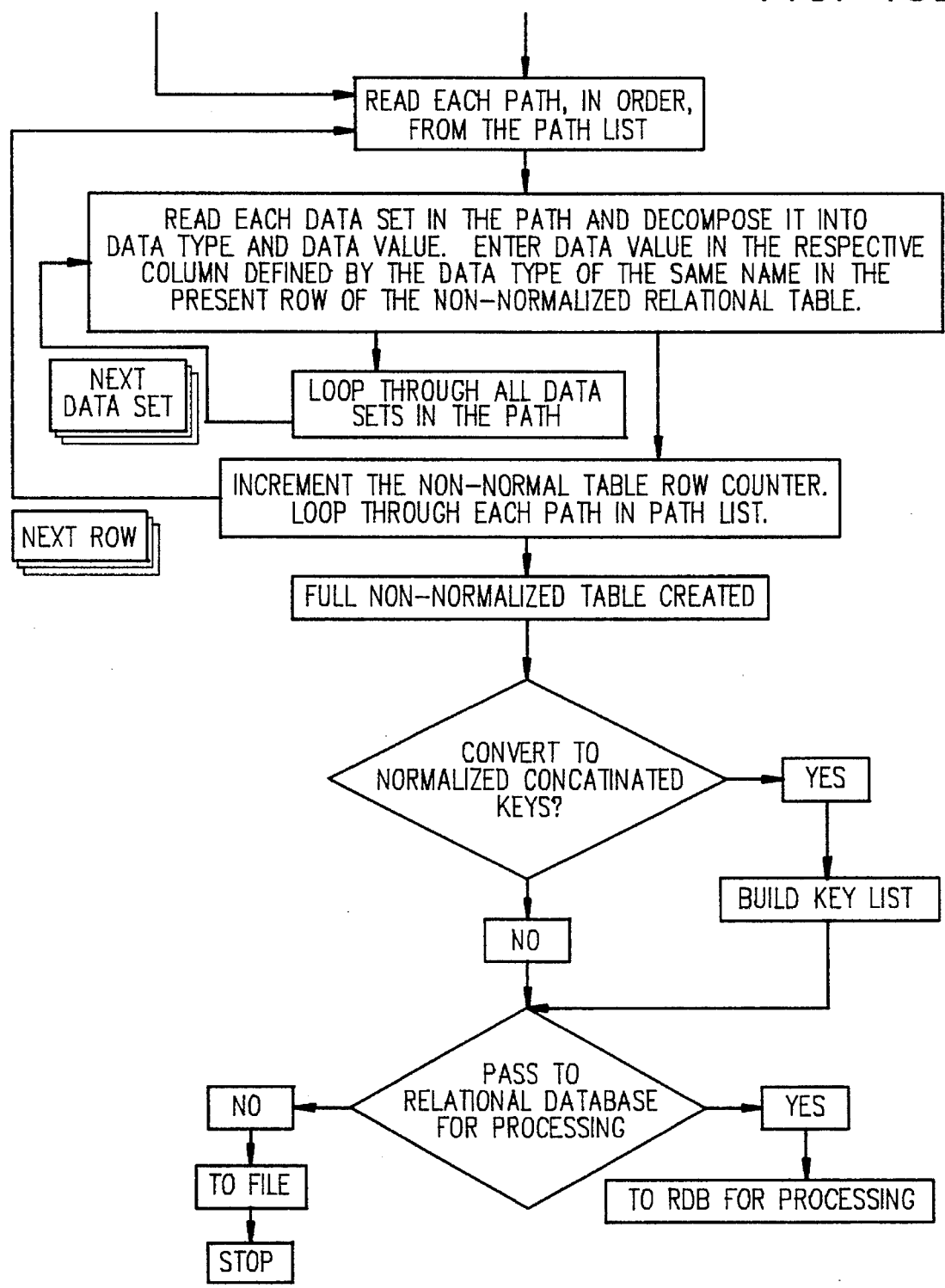
Figure 14A:
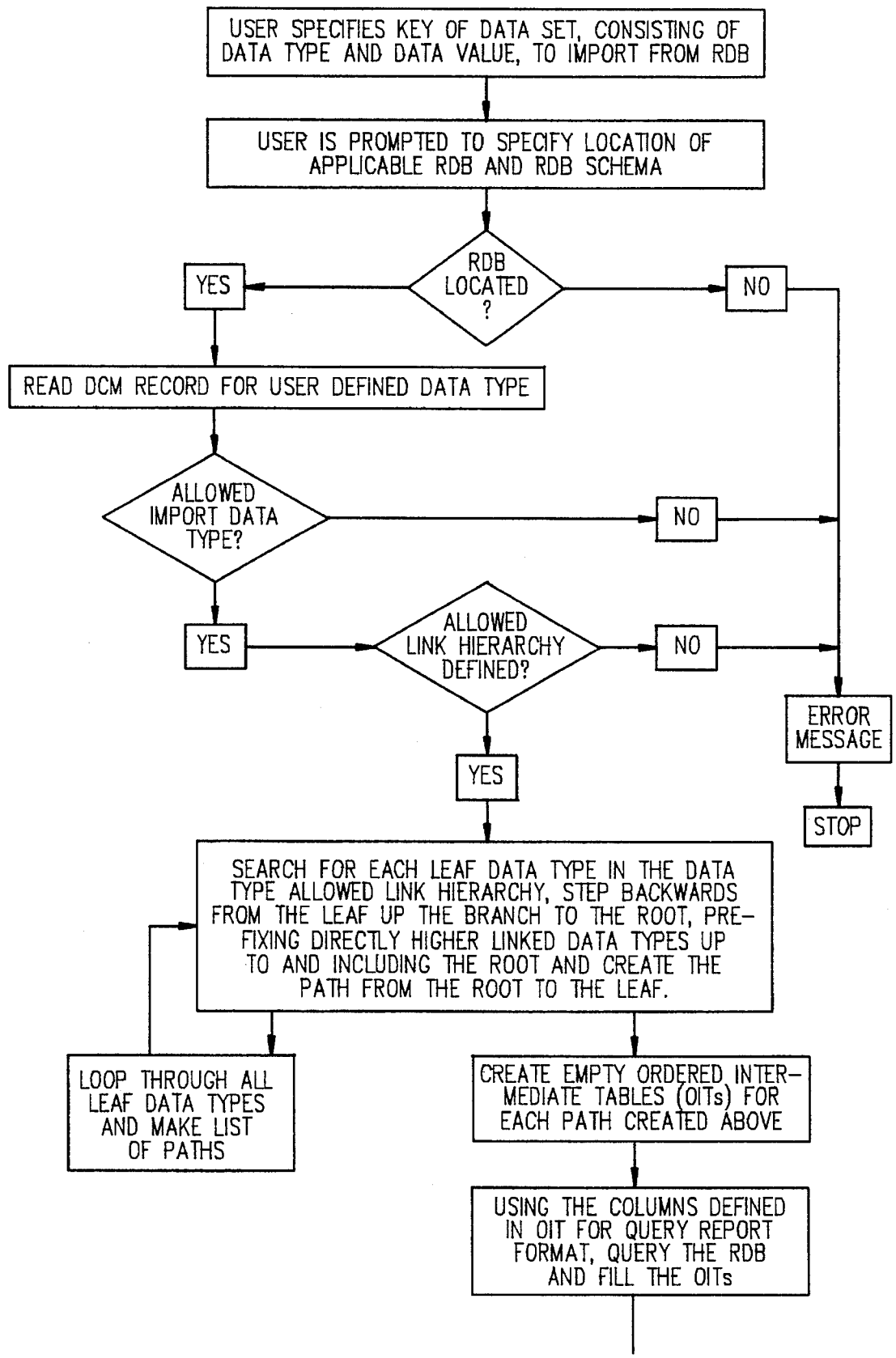
Figure 14B:
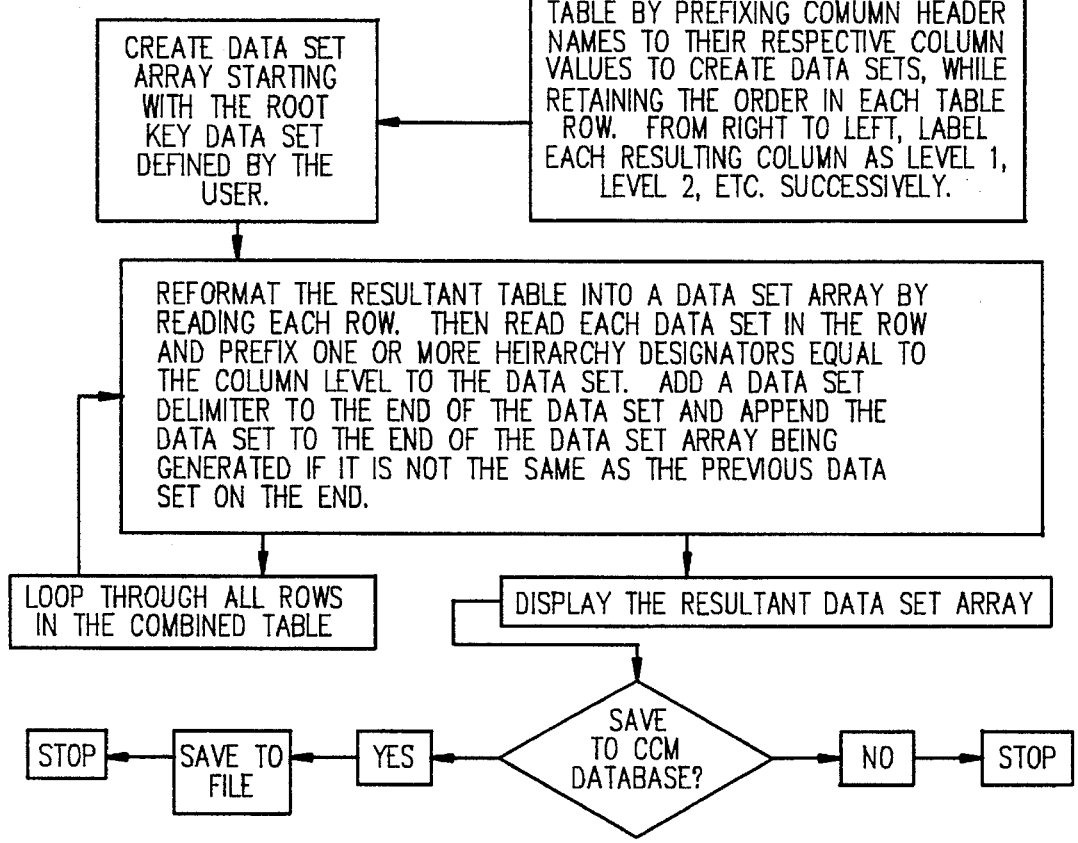
Figure 12:
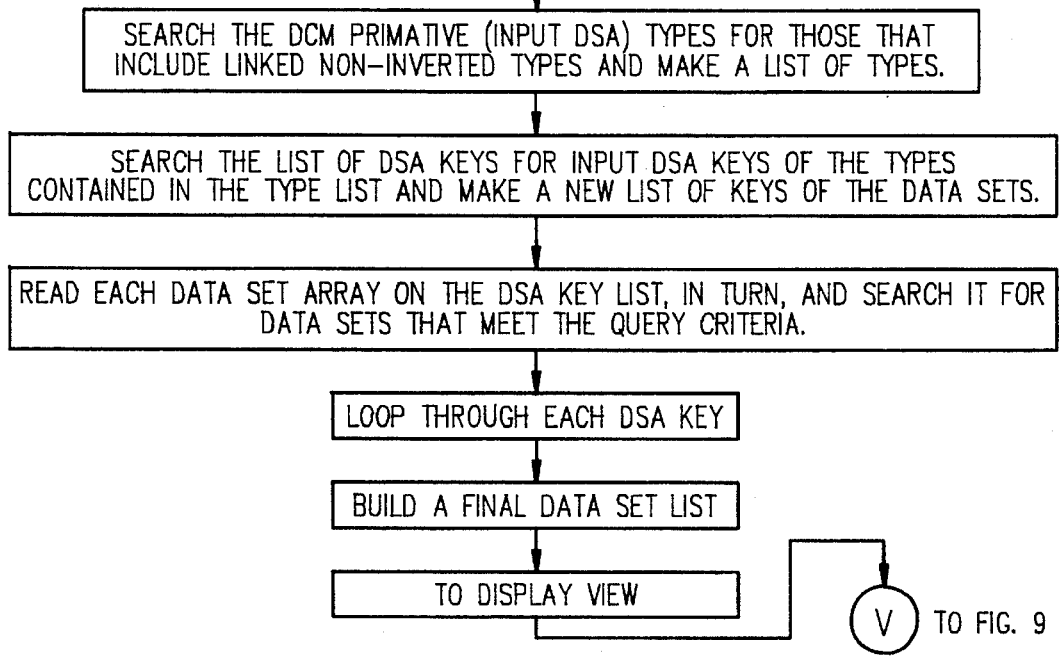

Relevant data from existing relational databases can be imported into a CCM database if the relational data is consistent with the data in the CCM database. Import is essentially a reversal of export with one major additional requirement. Since relational databases do not maintain the semantics of the relationships between entities, the CCM Data Control Module must be consulted and used as the source of connection logic to create the resultant outer-join of Data Set Arrays from the relational tables. FIG. 14 describes the EDB import process.

When data import is requested by the user, the user is prompted to specify the location of the database and the schema of the external relational database. The user is also prompted to specify the Key Data Set of the Data Set Array to be imported. EDB then reads the DCM for the Data Set Type of the Key Data Set and verifies: (1) that it is an allowed type which can be imported, and (2) that it has a defined allowed link hierarchy. If so, a set of empty Ordered Intermediate Tables (OIT) is created with ordered column headers created as follows:

In memory, the allowed Data Type's link hierarchy for the chosen Data Type is expanded into a set of all paths of link types. No path is duplicated as each leaf Data Type is visited only once. The total number of paths will equal the total number of leaf Data Types. Each path is a list of distinct Data Types in which successive Linked Data Types from the root are assembled into an ordered set from root to leaf with one, and only one, Data Type at each level. For example, the CustomerNumber Data Type allowed link hierarchy:

CustomerNumber
- Address
-- CITY
- CustomerName
- Phone would expand into three ordered paths:

CustomerNumber, Address, CITY
CustomerNumber, CustomerName
CustomerNumber, Phone Each of the created, ordered, Data Type Paths defines a separate ordered Intermediate Table column header and each of these ordered paths defines a query on the relational database. Queries are made on the external relational database for the user defined Key Data Set; and the Ordered Intermediate Tables are filled by using the results of those queries.

For example, assume that a Data Set array is to be created for CustomerNumber/0024 using the following relational tables:

CUSTOMER TABLE

| CustomerNumber | Customer-Name | Address | City |
|---|---|---|---|
| ... | | | |
| 0024 | A. Jones | 10 W St. | SEATTLE |
| 0025 | D. Smith | Easy St. | SEATTLE |
| ... | | | |

CUSTOMER-PHONE TABLE

| CustomerNumber | Phone 1 | Phone 2 |
|---|---|---|
| ... | | |
| 0024 | 206-674-2022 | 206-674-2644 |
| 0025 | 206-698-1657 | — |
| ... | | |

Using standard relational query procedures, data in these tables is used to build the following OIT ordered query result tables:

| CustomerNumber | Address | CITY |
|---|---|---|
| 0024 | 10 W St. | SEATTLE |

| CustomerNumber | CustomerName |
|---|---|
| 0024 | A. Jones |

| CustomerNumber | Phone |
|---|---|
| 0024 | 206-674-2022 |
| 0024 | 206-674-2644 |

These tables are then combined into a single table, identified by the previously defined Key Data Set, in which each of the column header names is prefixed to its column values to make a Data Sets. These Data Sets are maintained in the order defined by the originally defined paths and the resultant OITs. Accordingly, each column in the combined table is synonymous with a Linked Data Set level. The resultant table rows are sorted, relative to each other, in alphanumerical sequence, maintaining the existing column order. Using the example, the resultant combined table would be:

CustomerNumber:0024 TABLE

| Link level 1 | Link level 2 |
|---|---|
| Address/10 W St. | CITY/SEATTLE |
| CustomerName/A. Jones | |
| Phone/206-674-2022 | |
| Phone/206-674-2644 | |

The resultant combined table can be reformatted into a Data Set Array by: (a) reading each row and each Data Set in that row in turn; (b) prefixing one or more hierarchy designators to the Data Set, as defined by the column level; and (c) then adding the Data Sets, delimited by the End-Of-Data-Set delimiters, to the Key (root) Data Set in order. Prior to adding each Data Set, the previous Data Set is examined. If the previous Data Set with its hierarchy designators is the same as one being considered for adding, it is a duplicate and is not added, thereby eliminating duplicate Data Sets at the same level in the same hierarchy branch.

Using the example above, the resultant Data Set Array would be:

CustomerNumber/0024
- Address/10 W St.
-- CITY/SEATTLE
- CustomerName/A. Jones
- Phone/206-674-2022
- Phone/206-674-2644

ROLE EXCHANGE

As discussed above, each Data Set Array has a Key Data Set. All Linked Data Sets of a Data Set Array describe the Key Data Set of that particular array. The Key Data Set defines a specific object with a specific name (Data Type) and a specific value (Data Value). The Linked Data Sets in the Data Set Array describe the associations with the Key Data Set. For example, the Key Data Set: CUSTOMER/LANCE OTIS (with Data Type: CUSTOMER and Data Value: LANCE OTIS) would have Linked Data Sets which describe the CUSTOMER object in the role as a customer; e.g., ACCOUNT/12345, ORDER_NUMBER/45678, etc. The CUSTOMER object may be related to a more basic object such as PERSON/LANCE OTIS or to other roles that the basic object may play; e.g., HOME_OWNER/LANCE OTIS. In the role of the basic object as HOME_OWNER, the Linked Data Sets describing the Key Data Set HOME_OWNER/LANCE OTIS, could be: HOME_ADDRESS/#10 DOWNING, HOME_VALUE/$100000, etc. Other examples of Data Type roles could be ASSEMBLY in which the specific instance of the ASSEMBLY may also have a role as a SUB-ASSEMBLY in another ASSEMBLY. The ability to find and navigate between the roles that an object may perform in a database is called role exchange in this specification.

The Data Control Module provides the rules for role exchange for each Data Type. For example, for the Data Type PERSON, the DCM entry could contain alternate roles: CUSTOMER and HOME_OWNER. And for the Data Type HOME_OWNER, the DCM entry could contain alternate roles: CUSTOMER and PERSON. And for the Data Type CUSTOMER, the DCM entry could also contain alternate roles, e.g.: PERSON and HOME_OWNER.

The DCM entry for a Data Type may also contain pointers, as names of alternate methods, to specific algorithms for more complex role exchange rules which may be defined by the user and entered into the DCM for the specific Data Type. Such alternate methods may make provision for access to external databases, contain rules for role exchange on Data Types with different Data Values, etc.

Figure 15:
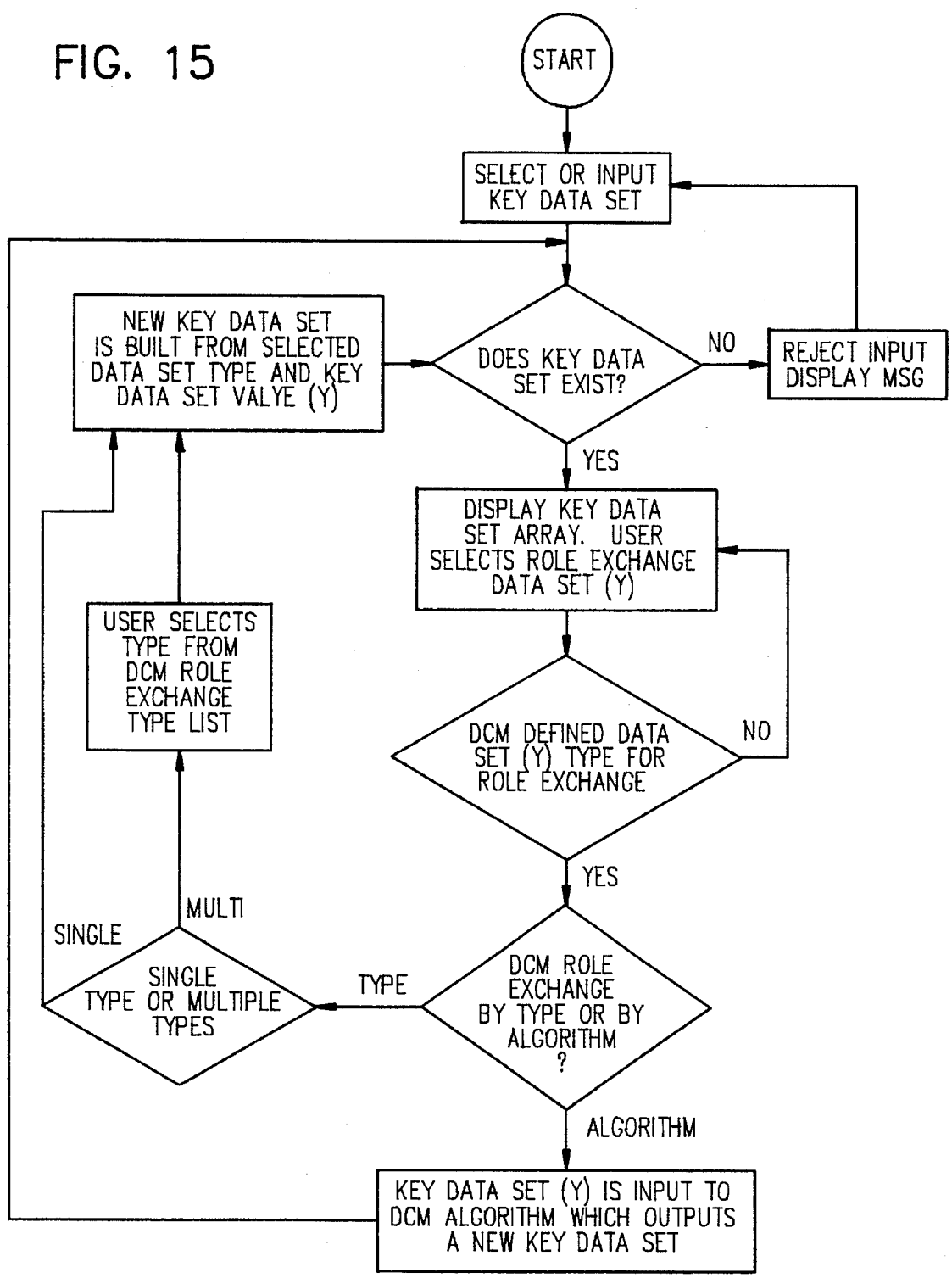
FIG. 15 is a flow chart of a role exchange method which embodies the principles of the present invention and is utilized to create additional relationships among the data being managed.

The ability to change the perspectives of an object's role is performed via a common element in the Key Data Set or a translation from one Key Data Set to another as shown in FIG. 15. For example, in the Data Set which follows, the data element of the Key Data Set SUPPLIER/PORTLAND PARTS:

[SUPPLIER/PORTLAND PARTS]
- [LOCATION/PORTLAND, OR]
- [MFR-PN/82A-26]
-- [MFR/GE]
- [PHONE/789-3456]

could also exist in the role of a manufacturer in the Key Data Set [MFR/PORTLAND PARTS] in a Data Set Array like:

[MFR/PORTLAND PARTS]
- [LOCATION/BEND, OR]
-- [MFR-PN/PP-001]
--- [COST/34.33]
- [PHONE/789-3456]

From the initial array being viewed, the user first selects the Key Data Set, then requests role exchange for that particular Data Set. The DCM is then consulted for the rules for constructing the new Key Data Set. For example, for the Data Type SUPPLIER, the role MFR may exist. Once found, the CCM (via the steps shown in FIG. 15) constructs a new Key Data Set MFR/PORTLAND PARTS. The CCM may then read the new Data Set Array into memory for display. If the new Key Data Set Array does not exist, a message is provided to the user to state the same.

Role exchange is not limited to a single Data Type, and multiple role exchange types may be defined; e.g., Type [MFR] could exchange with any number of other DCM Allowed Data Types such as [SUPPLIER], [STOCK INFO], and [EPA REQUIREMENTS]. If multiple Data Types are defined, the user must choose which one(s) should be used.

Role exchange provides a way to switch from one perspective to another. If role exchange is performed repetitively from Key Data Set to Key Data Set, a tree is generated of all parent-child-parent relations. This capability is defined in the DCM via a Role Exchange Type Table (e.g., Table 1 below), with a list of types, or with any other appropriate alternate method for transforming the original Key Data Set to the Role Exchanged Key Data Set (see FIG. 15).

TABLE 1

| DCM Data Type | Role Exchange Type(s) |
|---|---|
| [MFR] | [SUPPLIER] |
| [SUPPLIER] | [MFR] |
| [LOCATION] | [CITY] |
| [CITY] | [LOCATION] |
| [PICTURE] | [ALTERNATE METHOD:PAINTING] |

CUSTOM METHODS FOR DATA SET ARRAY MANIPULATION BY TYPE

The DCM may be configured to provide alternatives for all fundamental CCM processes involving a Data Type such as Data Set Array display and Data Set sort order. Within each Data Type record in the Data Control Module, separate fields may be defined which include, but are not limited to, rules for Data Set Array manipulation. Such fields can be defined for: alternate Data Set Array display methods, alternate Data Set Array maintenance methods, alternate Linked Data Set sort order methods, related external files, and alternate role exchange rules. These alternate methods are defined by the user and entered into the applicable DCM record for each type. This capability provides for the display and maintenance of Data Set Arrays in any form defined by the user. It also provides the capability to display data not stored within the CCM database such as a picture or a graphic summary of data.

An example of access to these alternate methods is the following:

The user enters the Key Data Set Array to be acted upon and the action to be performed; e.g., Display (normally, this is performed through a selection of menu options). Once the Key Data Set and the action are defined, the DCM record is read for the Data Type of the Key Data Set, and the field designated to contain the alternate method for the specific action is found. If that field contains an entry, the alternate method is loaded into memory and the designated action is performed on the defined Key Data Set; e.g., display of a picture associated with the Key Data Set. If no alternate action is defined, the default method built into CCM is used; e.g., a display of the Linked Data Sets as described in the '834 application.

DATA SET ARRAY RESTRAINTS

Data Type Input/Indenture Controls—Quantity (DTI/IC)

DCM linking limitations describe the acceptable position of Linked Data Sets relative to other Linked Data Sets within Data Set Arrays defined by specific Key Data Sets. DTI/IC adds to the DCM linking limitations the capability of controlling the quantity of each Linked Data Set relation. This allows the user to limit the number of specified Linked Data Sets for each Data Type to any value from 1 to n where n is a positive integer. With this control, the integrity of the database can be maintained much closer to the systems designer's original intent than might otherwise be the case.

The linking limitation exists in the DCM record for each type as a separate field. Within this field, each Linked Data Type and its allowed position in the link hierarchy is defined; and one item of additional information, link quantity, is provided.

The addition of a linking limitation quantity allows the DCM to: (1) verify the user input, and (2) stop the input even though the input may contain one or more additional and valid Data Set Type relations. The following is what the DCM linking limitation would look like for the Input Array Type [NAME] shown in Table 2.

TABLE 2

| Linking Limitation by Type for NAME | Link Restriction |
|---|---|
| [NAME] | |
| - [BIRTH DATE] | QUANTITY:1 |
| - [BIRTH PLACE] | QUANTITY:1 |
| - [CURRENTLY EMPLOY BY] | QUANTITY:NoRestriction |
| -- [HOURLY WAGE] | QUANTITY:1 |
| - [FORMERLY EMPLOYED BY] | QUANTITY:NoRestriction |
| -- [HOURLY WAGE] | QUANTITY:1 |
| - [PARENT NAME] | QUANTITY:2 |

With the limitation in Table 2 in force, a Data Set Array for a particular person might look like this:

[NAME/JOE DOE]
- [BIRTH DATE/56-01-22]
- [BIRTH PLACE/SEATTLE, WA]
- [CURRENTLY EMPLOYED BY/JAY CLEANERS INC.]
-- [HOURLY WAGE/8.00]
- [FORMERLY EMPLOYED BY/ACME INDUSTRIES]
-- [HOURLY WAGE/5.00]
- [FORMERLY EMPLOYED BY/BBH INC.]
-- [HOURLY WAGE/7.50]
- [PARENT NAME/SAM DOE]
- [PARENT NAME/JANE DOE]
- [ZIP CODE/98366]

A person should have only one [BIRTH DATE], and that limitation is accordingly imposed by DTI/IC. The number of former employers could be any number from none to n (no restriction). During the entry of data into the Data Set Array and in addition to consulting the DCM link hierarchy rules, the link quantity is read; and the data entry validated accordingly.

For example, the user selects the Key Data Set [NAME/JOE DOE] for update. The above, exemplary Data Set Array is displayed for update. The user enters an additional Data Set [BIRTH DATE/56-01-23]. Upon entry, the invention reads the DCM link restriction for the link Data Type relative to Key Data Type and advises the user that the quantity for this link is limited to one and that the user should delete the existing [BIRTH DATE] before entering a new one.

DATA SET ARRAY RESTRAINTS

Partial Data Set Array Locking (PDSAL)

Record locking is a common technique for limiting access to one user during an update or change to a record in a multi-user database environment. Concurrency of read and write operations necessitates locking so that, if one user has certain information, a second user does not change that same information without the first user knowing it. Constructs such as records are not used in the data management methods disclosed herein. Accordingly record locking mechanisms are inappropriate.

When CCM is applied to large amounts of data, Inversion is likely to create very large Data Set Arrays as a result of numerous Input Data Set Arrays. If the large arrays are totally locked by Key Data Set for modification by a single user, locking might create a performance bottleneck for other waiting users. A novel and better approach is to lock the Data Set Arrays by way of the active zone being affected by the change action or by way of the affected hierarchy branch in the Data Set Array. This allows multiple Data Set modifications to a single Data Set Array as long as the zones or branches and operations on those zones or branches are not in logical conflict. If two or more operations are in conflict, an operation (add, modify, delete) and queue order precedence is used to determine which transaction will succeed and which will be rejected.

In PDSAL, a common memory area is set aside, either on disk or in main memory. All users have access to this common memory area. Within the common memory area, the Key Data Sets and active zones or branches being modified are maintained for each applicable Data Set Array in a LOCKING TABLE; and either zone locking or branch locking of the Key Data Set Arrays in the common area is enabled.

Under zone locking, each Data Set Array is divided into zones of 16000 to 24000 bytes, for example; under branch locking, each Data Set Array is divided into major branches. Each of the divisions (zone or branch) may be grouped as a separate part of the original Data Set Array and can be provided with a separate key consisting of the original key and an appended zone or branch number flag. The first part of this group of sections or divisions is called the primary Data Set Array in this specification.

Only one locking method is used for each database, and that method is defined at database inception. As the Data Set Arrays are built and the Data Set Array becomes bigger than a preset value such as 16000 bytes, a zone or branch list is started and maintained and included in the primary Data Set Array in a hidden link position. The starting Linked Data Set hierarchy for each zone/major branch is maintained in the Data Set array for each zone/major branch in a list during the life of the Data Set Array. That list is modified as necessary as additions or deletions are made to the Data Set Array. An alternative method for the development of the zone/branch list is to: (1) read the Data Set Array and any divided groups each time the Key Data Set and the primary array is read into memory, (2) then create the lists by reading the first few links in each group, and (3) maintain this list in memory while the Data Set Array is being modified.

An example of zone/branch locking follows:

---

ZONE LOCKING DISTRIBUTION:

A zone distribution would look like this for
a large Data Set Array of telephone numbers:
    CITY/SEATTLE
    - PHONE/206-111-0111
    .
    .                ZONE 1
    - PHONE/206-222-0111
    .
    .                ZONE 2
    - PHONE/206-333-0111
    .
    .                ZONE 1
    - PHONE/206-444-0111
    .
    .                ZONE 4
    .
    - PHONE/206-999-0111
    .
    .                ZONE 9
    - PHONE/206-999-9999

The zone list maintained in the Data Set Array would look like this:
    ZONE 1:PHONE/206-111-0111
    ZONE 2:PHONE/206-222-0111
    ZONE 3:PHONE/206-333-0111
    ZONE 4:PHONE/206-444-0111
    .
    .
    ZONE 9:PHONE/206-999-0111

BRANCH LOCKING DISTRIBUTION:

A branch distribution would look like this
for a large Data Set Array of PARTS:

```
ASSEMBLY/0001
 - SUBASSY/0011
 *******        SUBASSY/0011 - BRANCH 1
   -- SUB-SUBASSY/0111
   --- PART/1111
   --- PART/1112
   --- PART/1113
   --- PART/1114
       .
       .
   --- PART/9999
 *******        SUBASSY/0011 - BRANCH 2
   -- SUB-SUBASSY/0211
   --- PART/1111
   --- PART/1112
   --- PART/1113
   --- PART/1114
       .
       .
   --- PART/9999
 *******        SUBASSY/0012 - BRANCH 3
   -- SUB-SUBASSY/0112
   --- PART/1111
   --- PART/1112
   --- PART/1113
   --- PART/1114
       .
       .
   --- PART/9999
 *******        SUBASSY/0012 - BRANCH 4
   -- SUB-SUBASSY/0212
   --- PART/1111
   --- PART/1112
   --- PART/1113
   --- PART/1114
       .
       .
   --- PART/9999
       .
       .
```

The major branch list maintained in the Data Set Array would look like this:

SUBASSY/0011:SUB-SUBASSY/0111—BRANCH 1
    SUBASSY/0011:SUB-SUBASSY/0211—BRANCH 2
    SUBASSY/0012:SUB-SUBASSY/0112—BRANCH 3
    SUBASSY/0012:SUB-SUBASSY/0212—BRANCH 2

In a representative procedure, the user selects the Key Data Set [CITY/SEATTLE] for update. The [CITY/SEATTLE] Data Set Array is displayed, and the Key Data Set is entered into the LOCKING TABLE if it does not exist in that table. The user enters an additional Data Set [PHONE/206-492-1234]. Upon entry, the zone list is read from the primary Data Set Array to determine the zone in which the Data Set should be entered. The LOCKING TABLE is then consulted to see if this zone is in use. If not, it is added to the active zones for the Key Data Set. Conversely, if the zone is in use (i.e., checked out), the user is advised that no change can be made within the boundaries of this zone and advises the user who checked out the zone that others are waiting to access it. If a transaction is pending, the invention can retry to perform the transaction for up to three tries before abandoning the action. Uncompleted transactions can be written to a pending transaction file for future disposition.

The LOCKING TABLE for the current example would look like this:

LOCKING TABLE

KEY DATA SET:[CITY/SEATTLE]
    LOCKED ZONE 4:PHONE/206-444-0111,
    CHECKED, OUT BY USER1

Upon completion of the transaction, the active zone is checked back in; and the LOCKED ZONE 4 entry is removed from the LOCKING TABLE. When the Data Set Array is no longer in use, its entry is removed as well.

Branch locking is performed in the same manner as zone locking except that the branch list is used. An alternative method for determining the active branch is to trace the Data Set Array from the location of the Data Set being modified to the root (KEY) and enter this full branch into the LOCKING TABLE with a flag entered into the common memory area indicating that full branch locking is being performed. Then, any accesses to the LOCKING TABLE are preceded by the creation of a new full branch hierarchy from the new Data Set of interest up to the root. If the new branch hierarchy is contained in the locked branch hierarchy, the transaction is not performed; and the actions described above for locked zones are taken.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of employing a computer with input means, memory, and a data processing unit to manage data, said method comprising the steps of:

employing said computer to create an original array of data sets, each said data set having a data type element for differentiating one kind of subject matter from another and a data value element for differentiating data sets with the same data type element and said original array containing a key data set and data sets related to said key data set;

employing said computer to link the related data sets in a hierarchy in which each of the related data sets is in an indentured relationship to the key data set;

so employing the computer to invert the relationship between at least one indentured data set in the original array and the remaining data sets in said array as to create an inverted data set array having: (a) said indentured data set as its key data set, and (b) all data sets higher in the hierarchy of the original data set linked to that key data set in inverted order;

employing said computer to create a file containing the original data array and the inverted data array or arrays; and employing said computer to construct and store a list of all the key data sets in said file.

2. A method as defined in claim 1 which includes the step of employing said computer to place successive items in said list at the beginning of successive data set arrays in said file.

3. A method of employing a computer with input means, memory, and a data processing unit to manage data, said method comprising the steps of:

employing said computer to create a file comprising an array of data sets, each said data set having a data type element for differentiating one kind of subject matter from another and a data value element for differentiating data sets with the same data type element and said array containing a key data set and data sets related to said key data set;

employing said computer to link related data sets in said array in a hierarchy in which each of the related data sets is in an indentured relationship to the key data set; and employing said computer to find any and all direct and indirect relationships among stored data types, data elements, and/or data sets that meet user specified criteria.

4. A method as defined in claim 3 which includes the step of providing means by which a user can input a request for at least one of the following selection criteria to the data processing unit of the computer: data sets with a particular type, data sets with a particular data value, particular data sets, and data sets with a particular relationship therebetween.

5. A method as defined in claim 4 in which the user's request is fulfilled by building a separate list of key data sets for each of said selection criteria and searching said list for key data sets which meet all of the selection criteria.

6. A method as defined in claim 4 in which the user's request encompasses more than one data type and is fulfilled by searching said file for all allowed linked data types and creating a list of linked data types common to all of the related data sets.

7. A method as defined in claim 4 in which the user's request is fulfilled by making a list of the key data sets in inverted data set arrays that meeting the selection criteria, making a list of the key data sets in original data set arrays that meet the selection criteria, counting the number of key data sets in each of said lists, and searching the list with the smaller number of key data sets for key data sets that meet all of the selection criteria.

8. A method as defined in claim 7 in which the number of links between the data sets in each of those data set arrays in the list that is searched is counted, the data set array with the smallest link count is searched for key data sets which meet the selection criteria, the data set array with the next smallest link count is searched for data sets found in the preceding search of a data set array, and the search is continued through data set arrays with numbers of links in ascending order until a data set array with no data sets meeting all the selected criteria is found or until all of the data set arrays have been searched and any data sets meeting all of the selection criteria have been identified.

9. A method as defined in claim 7 in which the number of links between the data sets in each of those data set arrays in the list that is searched is counted and in which the data set arrays are then searched by ascending number of links for data sets meeting all of the selection criteria.

10. A method as defined in claim 4 in which the selection criteria encompass more than one data type, in which the data types are of at least two different kinds, in which the file is searched separately by kind of data type for data sets which meet all of the selection criteria, and in which the results of the separate searches are combined into a composite view of said file.

11. A method for managing data which comprises the steps of:

creating an array of data sets, each said data set having a data type element for differentiating one kind of subject matter from another and a data value element for differentiating data sets with the same data type element, said array containing a key data set and data sets related to said key data set and the related data sets being linked to the key data set in a multiple level hierarchy in which each of the related data sets is in an indentured relationship to the key data set; and providing a process via which data sets in said array and/or the data types and data elements making up said data sets can be exported to an external database.

12. A method as defined in claim 11 which includes the process that allows for export of data in said array comprises the steps of:

tracing a hierarchy path consisting of all directly related data sets in said array;

expanding the hierarchy path into a set of all paths between the key data set and the related data sets, each said path being a list of key and related data sets with only one data set at any level of the hierarchy;

creating a relational table with a column heading for each of the data types in said data set array;

decomposing the data sets in said set of paths path-by-path into a data type and a data value; and entering the data values into the relation table under the appropriate heading.

13. A method as defined in claim 12 which includes the step of converting the entries in each row of the non-normalized table into a concatenated key of non-null values such that said values define a set of fully normalized tables corresponding to the columns in the non-normalized table.

14. A method as defined in claim 12 which includes the step of decomposing the non-normalized table into a set of normalized relational tables.

15. A method for managing data which comprises the steps of:

creating a file comprising one or more arrays of data sets, each said data set having a data type element for differentiating one kind of subject matter from another and a data value element for differentiating data sets with the same data type element, said array containing a key data set and data sets related to said key data set and the related data sets being linked to the key data set in a hierarchy in which each of the related data sets is in an indentured relationship to the key data set;

said data set array being created by importing data into said file from an external database.

16. A method as defined in claim 15 in which data is imported into said file by:

verifying that said data is of an allowed kind and that it has a permitted link hierarchy;

creating a set of ordered intermediate tables with headings corresponding to queries on the external data base;

combining said tables into a single table in which each of the column headings is prefixed to its column values to create data sets, each having a data type defined by the column value; and reformatting said table as a data set array.

17. A method as defined in claim 16 in which the data sets are placed in the combined table in the order defined by the ordered intermediate tables and each column in the combined table is accordingly a linked data set level.

18. A method as defined in claim 16 in which the combined table is reformatted into a data set array by:

reading each row in said table and each data set in that row;

prefixing at least one hierarchy designator corresponding to the level of the data set in a row to each said data set;

inserting end-of-data-set delimiters at the end of each said data set; and adding the thus delimited data sets in order to a user defined key data set to create a data set array as aforesaid.

19. A method as defined in claim 18 which includes the step of excluding from addition to the data set array being created any data set which is a duplicate of an already added data set in the same branch of the hierarchy of data sets in the array.

20. A method for managing data which comprises the steps of:

constructing a first data set array comprising:

a key data set which heads said array and characterizes said array by a data type element which differentiates one kind of subject matter from another and a data value element which differentiates data sets with the same data type element; and a data set linked to said key data set, said linked data set also having a data type element for differentiating one kind of subject matter from another and a data value element for differentiating data sets with the same data type element;

providing a data control module with the capability of replacing the data type element in the key data set with a different data type element to create a new key data set with a different characterization of the data value in said key data set; and constructing a new data set array headed by said new key data set.

21. A method as defined in claim 20 which includes the step of providing a table containing data types for which the data type of the key data set heading the first data set array may be exchanged.

22. A method as defined in claim 20 which includes the step of configuring the data control module to include instructions governing the substituting of a different data type for the data type in the key data set heading the first data set array.

23. A method as defined in claim 20 in which said data type element is exchanged with a plurality of different data type elements.

24. A method for managing data which comprises the steps of:

constructing a database comprising an array of data sets, each having a data type element for differentiating one kind of subject matter from another and a data value element for differentiating data sets with the same data type element; and providing a data control module with a record for at least one data type, said record having at least one field in which a user can place instructions for performing an operation on or related to the data in said database in a manner designated by the user.

25. A method as defined in claim 24 in which the data control module contains default instructions for performing said operation in the absence of instructions placed in said module by the user.

26. A method of employing a computer with input means, memory, and a data processing unit to manage data, said method comprising the steps of:

employing said computer to create an array of data sets, each said data set having a data type element for differentiating one kind of subject matter from another and a data value element for differentiating data sets with the same data type element and said array containing a key data set and data sets related to said key data set;

employing said computer to link the related data sets in a hierarchy in which each of the related data sets is in an indentured relationship to the key data set;

so employing the computer to invert the relationship between an indentured data set in the array and the remaining data sets in said array as to create an inverted data set array having: (a) the data set entered in the original array as its key data set, and (b) all data sets higher in the hierarchy of the original data set linked to that key data set in inverted order; and employing said computer to inhibit inversion of any data sets in said array which have a user-specified data type.

27. A method of employing a computer with input means, memory, and a data processing unit to manage data, said method comprising the steps of:

employing said computer to create an array of data sets, each said data set having a data type element for differentiating one kind of subject matter from another and a data value element for differentiating data sets with the same data type element and said array containing a key data set and data sets related to said key data set;

employing said computer to link the related data sets in a hierarchy in which each of the related data sets is in an indentured relationship to the key data set; and employing said computer to limit the relationships among the data sets in said array.

28. A method for managing data which comprises the steps of:

creating a database comprising plural data set arrays, each said data set array having a data type element for differentiating one kind of subject matter from another and a data value element for differentiating data sets with the same data type element, said array containing a key data set and data sets related to said key data set, and the related data sets being linked to the key data set in a hierarchy in which each related data set is in an indentured relationship to the key data set; and employing said key data sets to access the data in said database hashed key data or by sort order.

29. A method for managing data which comprises the step of creating a database which comprises a plural array of data sets;

each said data set having a data type element for differentiating one kind of subject matter from another and a data value element for differentiating data sets with the same data type element;

each data set array containing a key data set and data sets related to said key data set;

the related data sets being linked to the key data set in a hierarchy in which each related data set is in an indentured relationship to the key data set; and at least one of said data set arrays having a first related data set which is linked directly to said key data set and a second related data set which is linked to the key data set through one or more of the other related data sets in the hierarchy.

30. A method for managing data which comprises the steps of:

creating an array of data sets, each said data set having a data type element for differentiating one kind of subject matter from another and a data value element for differentiating data sets with the same data type element, said array containing a key data set and data sets related to said key data set, and the related data sets being linked to the key data set in a hierarchy in which each related data set is in an indentured relationship to the key data set; and processing each of the data sets in said array as an indivisible composite of a data type element and a data value element.

* * * * *